Dec. 9, 1958     M. J. KELLY     2,863,549
SUBCYCLE CONTROL FOR SERIAL-PARALLEL PRINTER
Filed May 22, 1956     8 Sheets-Sheet 1

| FIG.1c | FIG.1d |
|---|---|
| FIG.1b | FIG.1a |

INVENTOR.
MARTIN J. KELLY

BY
J. X. Morser
AGENT

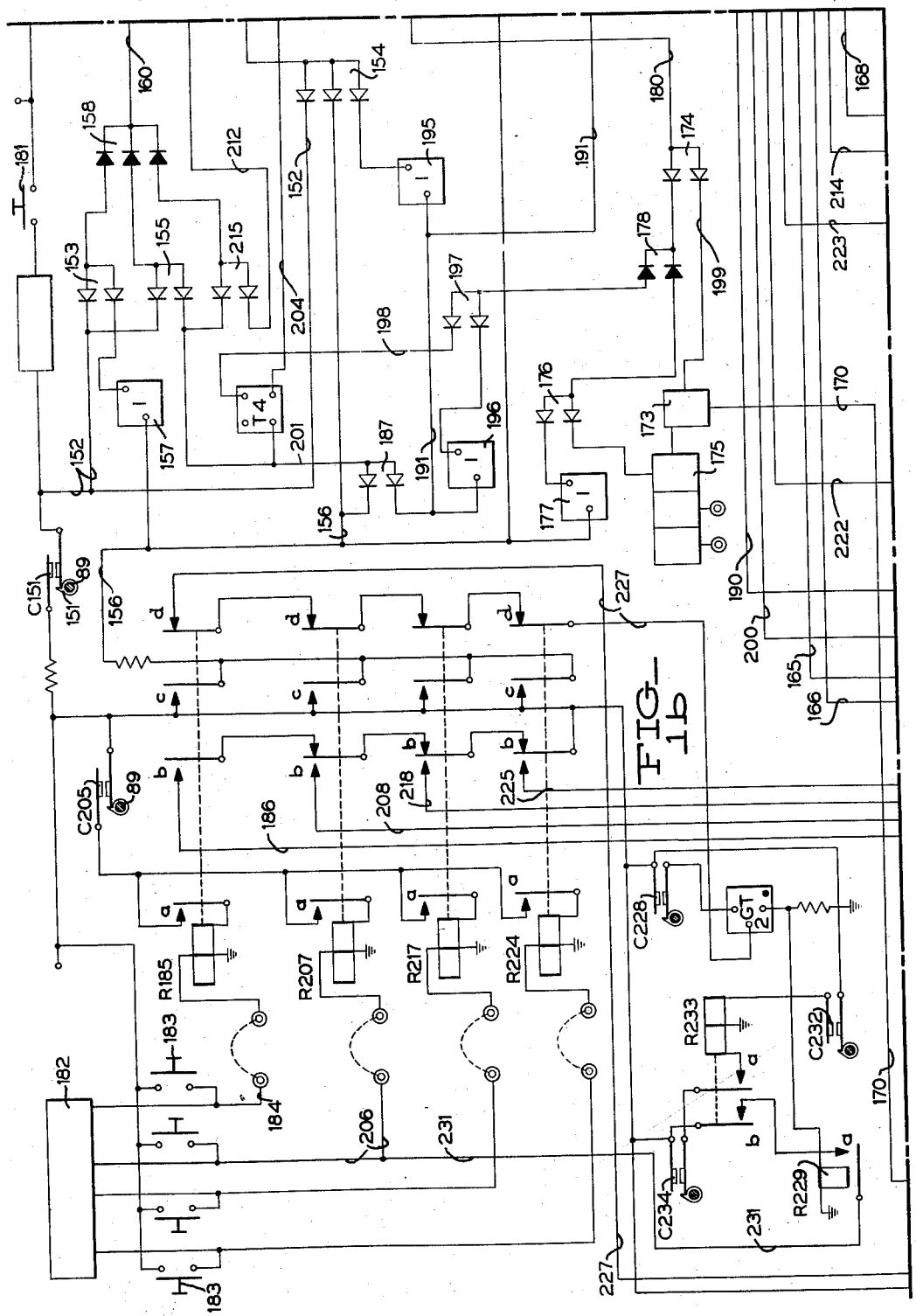

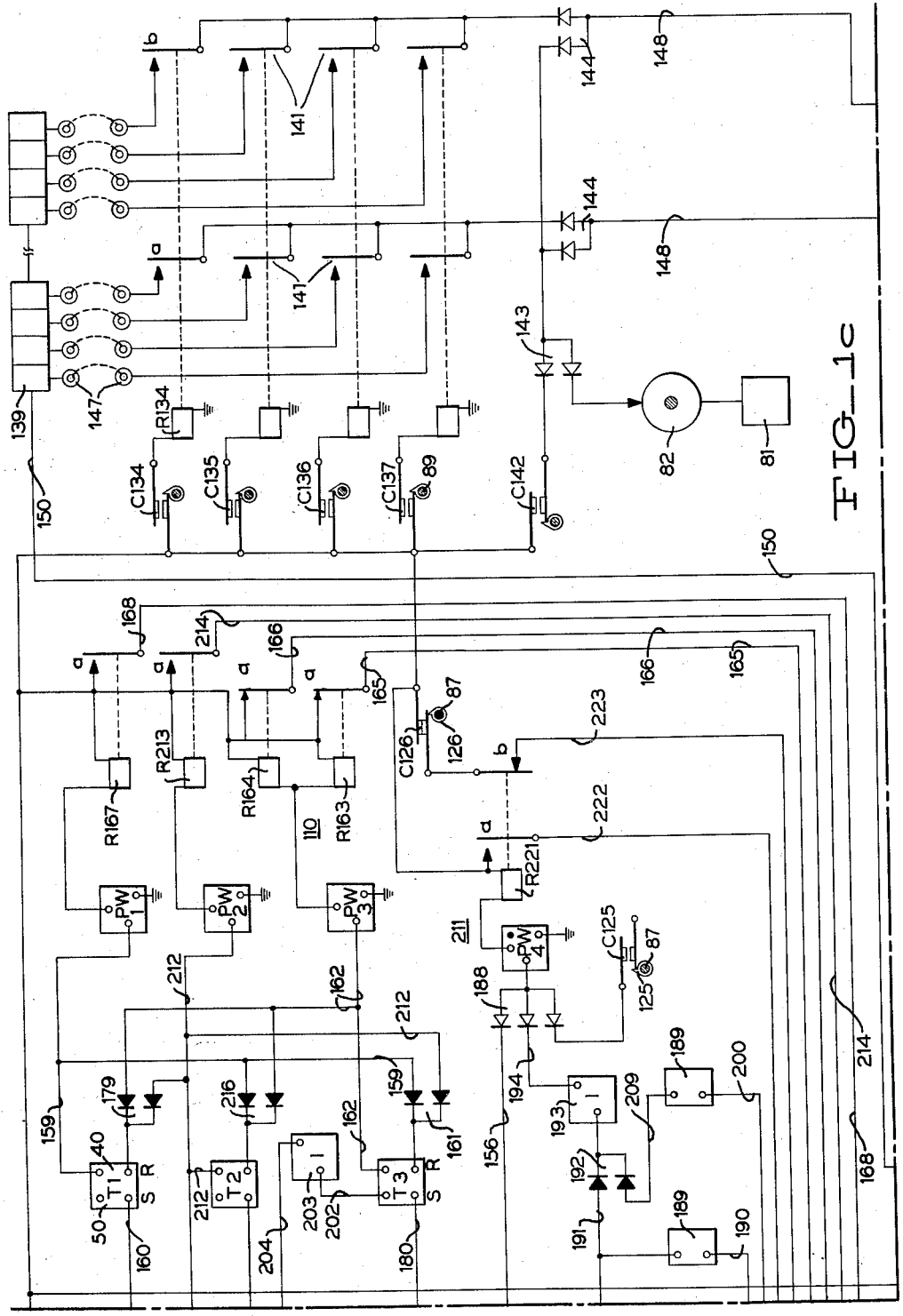

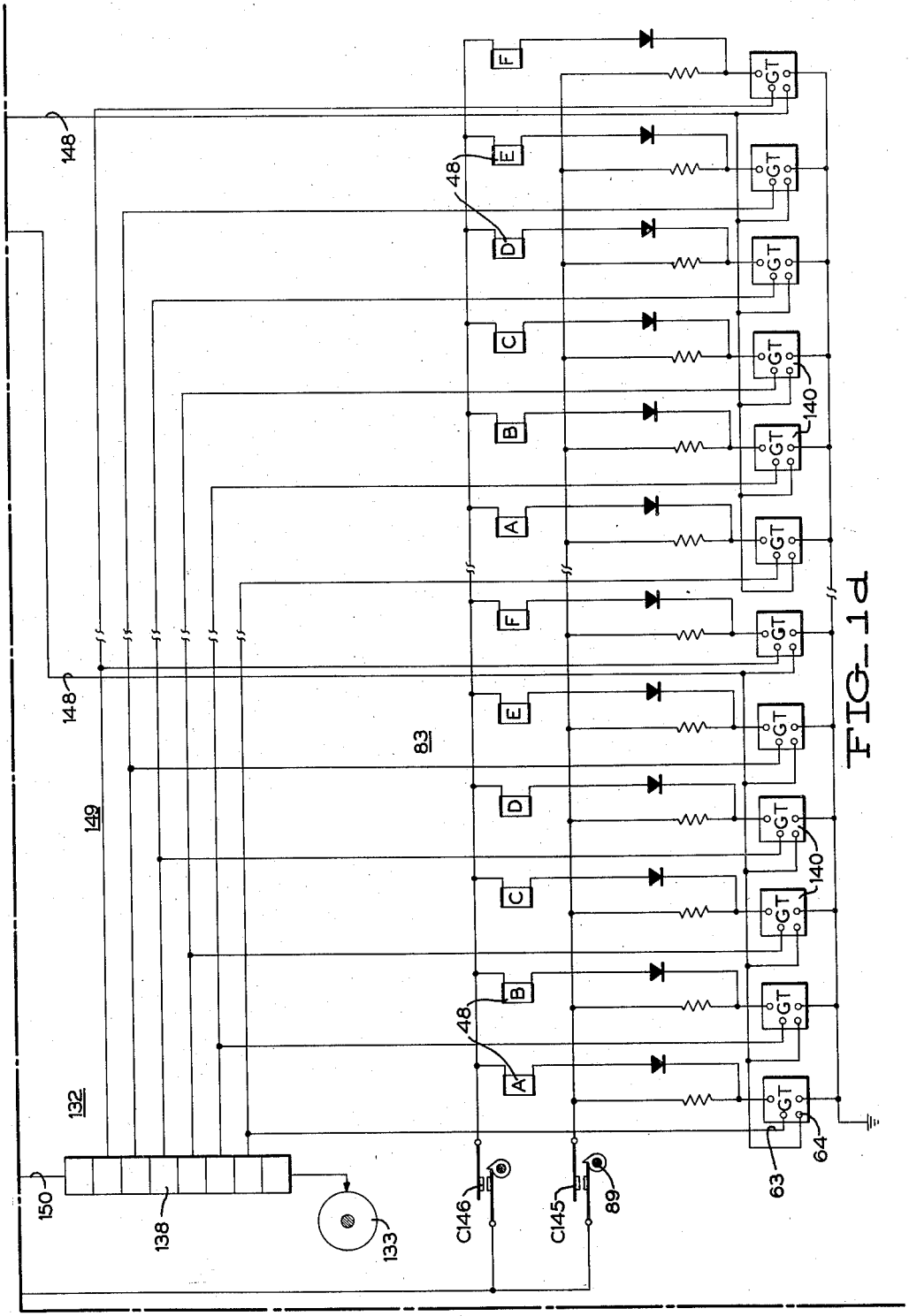

Dec. 9, 1958     M. J. KELLY     2,863,549
SUBCYCLE CONTROL FOR SERIAL-PARALLEL PRINTER
Filed May 22, 1956     8 Sheets-Sheet 5
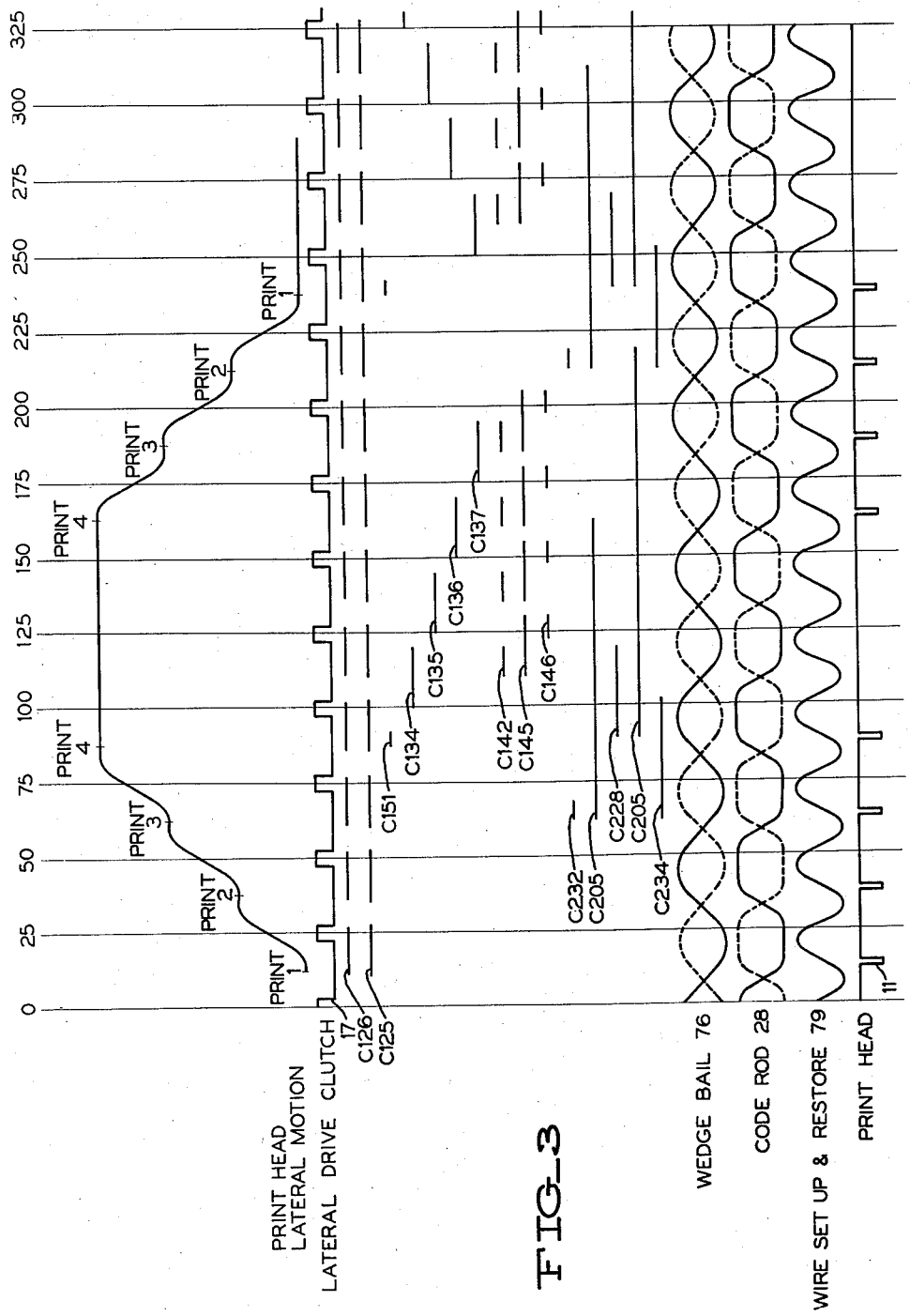
FIG_3

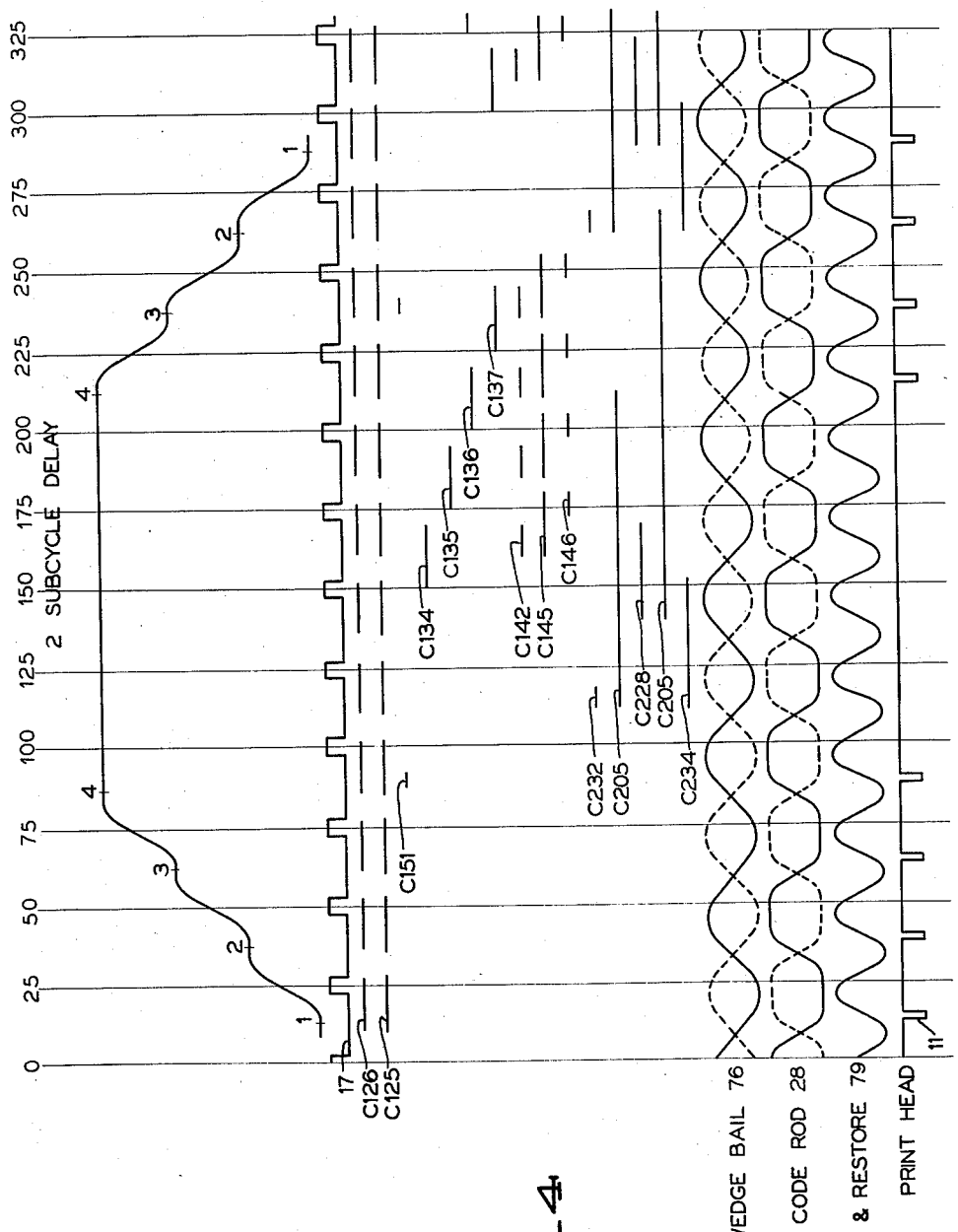
FIG_4

Dec. 9, 1958 M. J. KELLY 2,863,549
SUBCYCLE CONTROL FOR SERIAL-PARALLEL PRINTER
Filed May 22, 1956 8 Sheets-Sheet 7
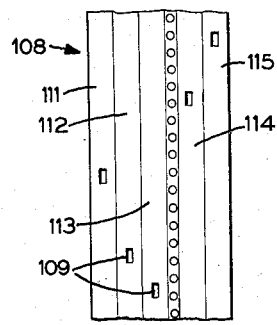
FIG_6
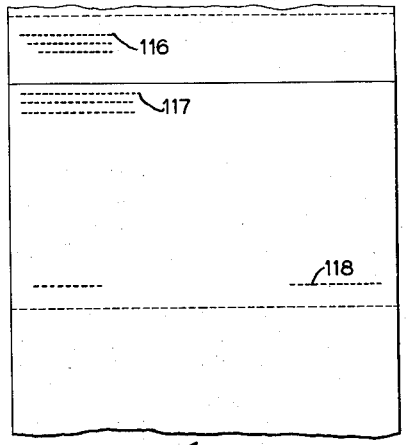
FIG_5
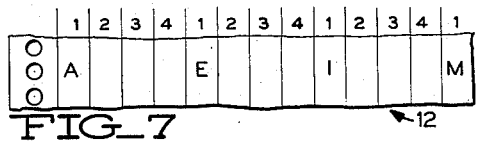
FIG_7
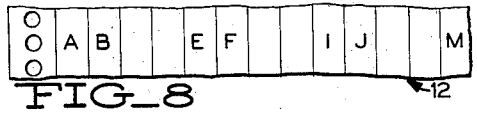
FIG_8
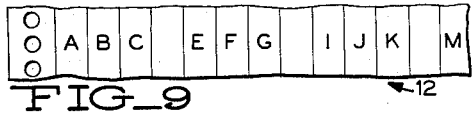
FIG_9
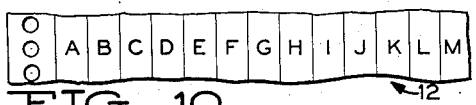
FIG_10
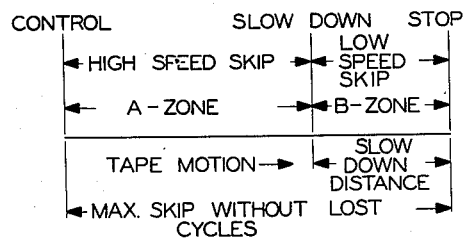
FIG_12
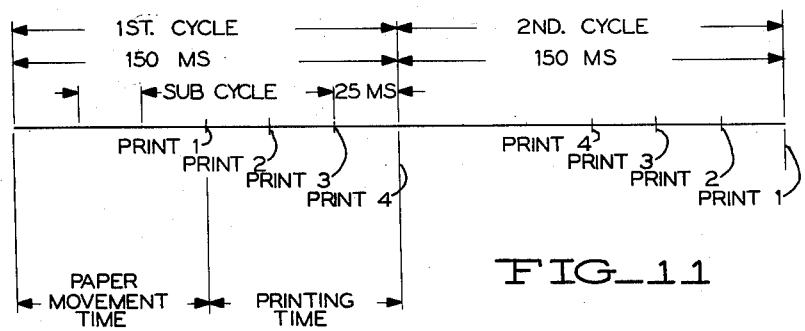
FIG_11

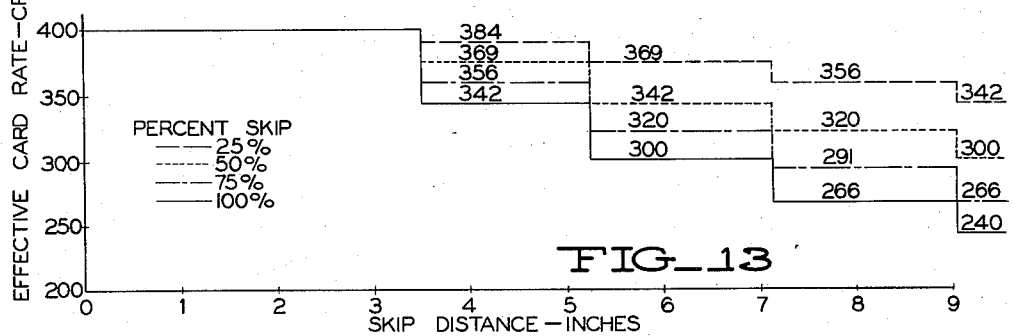
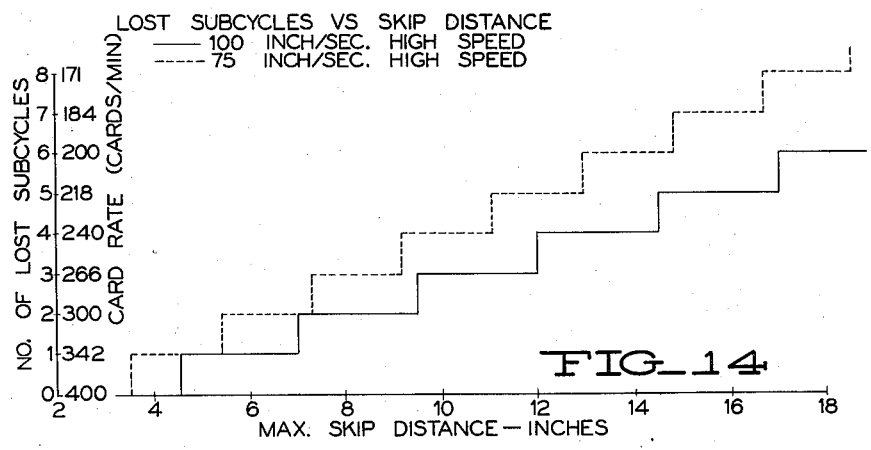
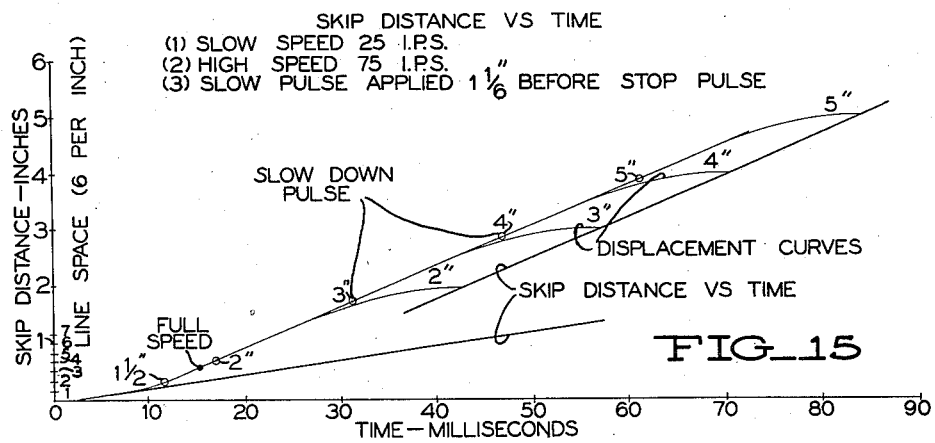

United States Patent Office 2,863,549
Patented Dec. 9, 1958

2,863,549

SUBCYCLE CONTROL FOR SERIAL-PARALLEL PRINTER

Martin J. Kelly, Endwell, N. Y., assignor to International Business Machines Corporation, New York, N. Y., a corporation of New York Application May 22, 1956, Serial No. 586,408

18 Claims. (Cl. 197—133)

The invention relates to a control for printers and more particularly to control means for high speed printers wherein the printing of a line of data requires more than one printing operation for each type member.

It is one of the prime objects of the invention to provide a cyclically operated printer with a control means which is responsive to necessary record material movement to suspend printer operation for a portion of a normal printing cycle.

With the advent of high speed printing devices, such as wire printers or the like, it is necessary to provide means for advancing record material rapidly at both line space and eject speeds in order to obtain maximum printer output.

In order to reduce the over-all cost of the printing devices, the number of printing heads or positions may be reduced on some multiple to provide a serial-parallel printing type operation. A serial-parallel type of printer may be defined as a print unit in which each type member prints more than one character for each line of printing.

At the present time there are in existence two types of print units which may be considered for serial-parallel operation. These are the wire printer and the stick printer. In the serial-parallel method of printing, the print unit must be able to operate at greatly increased speeds. The rate of operation is proportionate to the number of characters each print position must print on one line.

It is the purpose of the serial-parallel printer to take advantage of the high speed potentialities of these printers to reduce the number of components required in a lower speed printer. For example, a line having 120 character positions may be provided with 60, 40, 30, 24, 20, etc., wire printing heads. With a 30 print head printer, each print head makes four successive impressions to complete the printing of a line of data. If a 20 print head printer were employed, each print head makes six impressions to complete the printing of a line of data.

In order to read and print a line of data and then line space the record to its next data receiving position consumes a predetermined amount of time which may be defined as a cycle of operation or printing cycle. This printing cycle may be divided into a predetermined number of fixed subcycles. As will be hereinafter more fully described, the number of subcycles which are combined to form a printing cycle will depend to a certain extent on the number of serial-parallel print operations required to complete the printing of a line of data. For example, the printer may, when incorporating thirty heads in a 120 character line, be divided to include six subcycles and in some instances four subcycles. Under the latter condition, one subcycle is provided for each printing operation and the record or form is line spaced between the fourth subcycle of the line being printed and the first subcycle of the following or subsequent printing cycle. When a six subcycle serial-parallel printing takes place, the first four subcycles may be utilized for the printing of the line of data while the last two subcycles of operation permit movement of the record or form to provide for line space and skips.

In the example to be given, operation of the record feeding carriage at normal low speed takes place at approximately twenty-five inches per second which is equivalent to 500 lines per minute and high speed skipping or eject operation occurs at approximately seventy-five inches per second or 1,500 lines per minute. Thus low speed operation of the carriage is called upon to single, double or triple line space or to skip up to 1⅙ inches of the record and the high speed operation is called upon to advance the record for skips over 1⅙ inches to 3½ inches in length. Under these conditions, sufficient time is available to move the record the required distance without interrupting the normal printing operation. During conditions where long skips or eject operations are called for, the record will not have sufficient time to reach the desired position or line for printing. Therefore, skips or ejects in excess of 3½ inches will interrupt printer operation for a number of subcycles equal to that required by the record or form movement. This action prevents the first and subsequent impressions from being made while the form is still moving.

The usual procedure under long skip and eject conditions is to provide a means for disconnecting the printer so that printing cannot occur until the desired line on the record reaches some predetermined position. However, when the time required for record movement extends into the next or second printing cycle, operation of the printer is further delayed until the beginning of the following or third printing cycle. Thus with every record feeding operation which cannot be completed by the beginning of the next printing cycle, the printer loses this entire cycle. This loss of a complete print cycle reduces the output of the printer considerably.

This invention is directed to a control means which is operative to interrupt the printing operation in the event the desired line on the record cannot reach the proper position in time to permit printing at the beginning of the next printing cycle. However, in this instance, only that portion of a printing cycle is lost which is required to complete movement of the record. As the moving record reaches a predetermined position, a signal is given to initiate the printing cycle at the beginning of the next normal printing subcycle. From this point the printer begins a new cycle of operation and cyclically operates until the next interruption signal is received from the record or form feeding control. With a construction of this type, the loss in printing time during long skips and eject operations may be reduced considerably.

In the embodiment disclosed, a wire printer, operating on fixed subcycle timing, is provided and includes a record feeding carriage provided with a control means which comprises an endless channeled tape having a plurality of control punches, spots or the like adapted to control the various skip, eject and other printer operations. This control includes sensing means to detect the control indications in the various channels. When a long skip or an eject condition is detected in one of the channels which will require more than the normal allotted time for record movement to position the selected line for printing, a signal is generated to disconnect or disable the printing mechanisms.

Disconnection of the printing mechanisms prevents setup of the printing devices or code rods and at the same time may react to limit further data input to the buffer storage device. One means for interrupting the printing operation is to place a clutch mechanism or the like between the printer drive means and certain of the cam operated printer control contacts.

While the printer operation is interrupted, carriage movement continues at high speed and the subcycle timing remains fixed. As the selected control spot on the tape, indicating the location of the desired line, enters a first area, a signal is transmitted to indicate that the desired line on the record will reach the print receiving position within some predetermined time limit. With the form still advancing at high speed, the printer control cams and the like are conditioned to be relatched to the drive means at the beginning of the next timed subcycle. When this point is reached, printer operation is again initiated and the setup of the first character at each print head is started. As the control spot in the tape passes from the first area, it enters a second control area whereat a second signal is generated to terminate high speed carriage operation and decelerate the carriage, form and control tape to low speed.

The record movement continues to advance at low speed until the control spot leaves the second control area, after which the carriage is braked to a stop. The timing of the setup mechanisms and stopping of the record at the desired line is such as to have the first subcycle printing operation take place shortly after the record reaches a stop. This printing completes the first subcycle printing operation and as the printing devices are returned, the character selecting means has already begun its setup for selecting the next desired character in the second subcycle operation. Once the printing of a line of data is initiated, all subsequent subcycle printing operations follow at fixed time intervals.

With a control of this type, long skip, eject or overflow conditions merely retard printer operation for a length of time sufficient to bring the record or form to a stop. After the next or subsequent printing cycle is initiated, the timing is such as to ignore the previously lost subcycles.

While printers of the type described are rated at 400, 500, 1,000, and so forth, lines per minute, this rating is based on printing with no lost cycles; that is, it is assumed the line spacing and any required skips will all occur during the time allotted between the end of one printing cycle and the beginning of the next. However, in actual practice and under certain operating conditions, particularly when printing on long forms or the like, a relatively high percentage of the printing cycles may be lost due to the long skip and eject signals. By incorporating the above-described printer subcycle control means, the net output of the printer may be maintained at a rate relatively close to its rated output.

It is therefore another object of the invention to provide a cyclically operated printer with a control means which is responsive to required form movement to operate the printer with a minimum loss of printing time.

It is another object of the invention to provide a cyclically operated printer with a control means which is operative to initiate the printing operation in synchronism with record movement to attain higher net printing speeds.

It is still another object of the invention to provide an improved control means for advancing continuous form material under control of a tape with selected controlling areas for accelerating and decelerating the forms at high speed.

It is another object of the invention to provide a cyclically operated printer having a form feeding carriage operated after the last printing subcycle to advance the form with a carriage operated control means which delays the first printing subcycle until the form reaches a predetermined position.

It is still another object of the invention to provide a cyclically operated printer with a tape controlled carriage which predetermines the number of subcycles the printer must be delayed during a skip operation to maintain maximum printer output.

It is yet another object of the invention to provide a cyclically operated printer with a carriage control means synchronized with basic subcycle timing, both of which are operative to initiate printer operation at any later appearing subcycle.

Other objects of the invention will be pointed out in the following description and claims and illustrated in the accompanying drawings, which disclose, by way of examples, the principle of the invention and the best mode, which has been contemplated, of applying that principle.

In the drawings:

Figs. 1a to 1d show an exploded diagrammatic isometric view of one form of printer and a schematic wiring diagram having the improved subcycle control means applied thereto.

Fig. 2 is a diagram showing the arrangement of Figs. 1a to 1d.

Fig. 3 is a timing diagram for a normal printing cycle showing the various cam contact and print head operations.

Fig. 4 is a view similar to Fig. 3 showing the printer operation when a subcycle delay is necessary.

Fig. 5 is a view of a sample record or form on which data is to be printed.

Fig. 6 is a developed view of a typical control tape for the form shown in Fig. 4.

Figures 1A, 2:
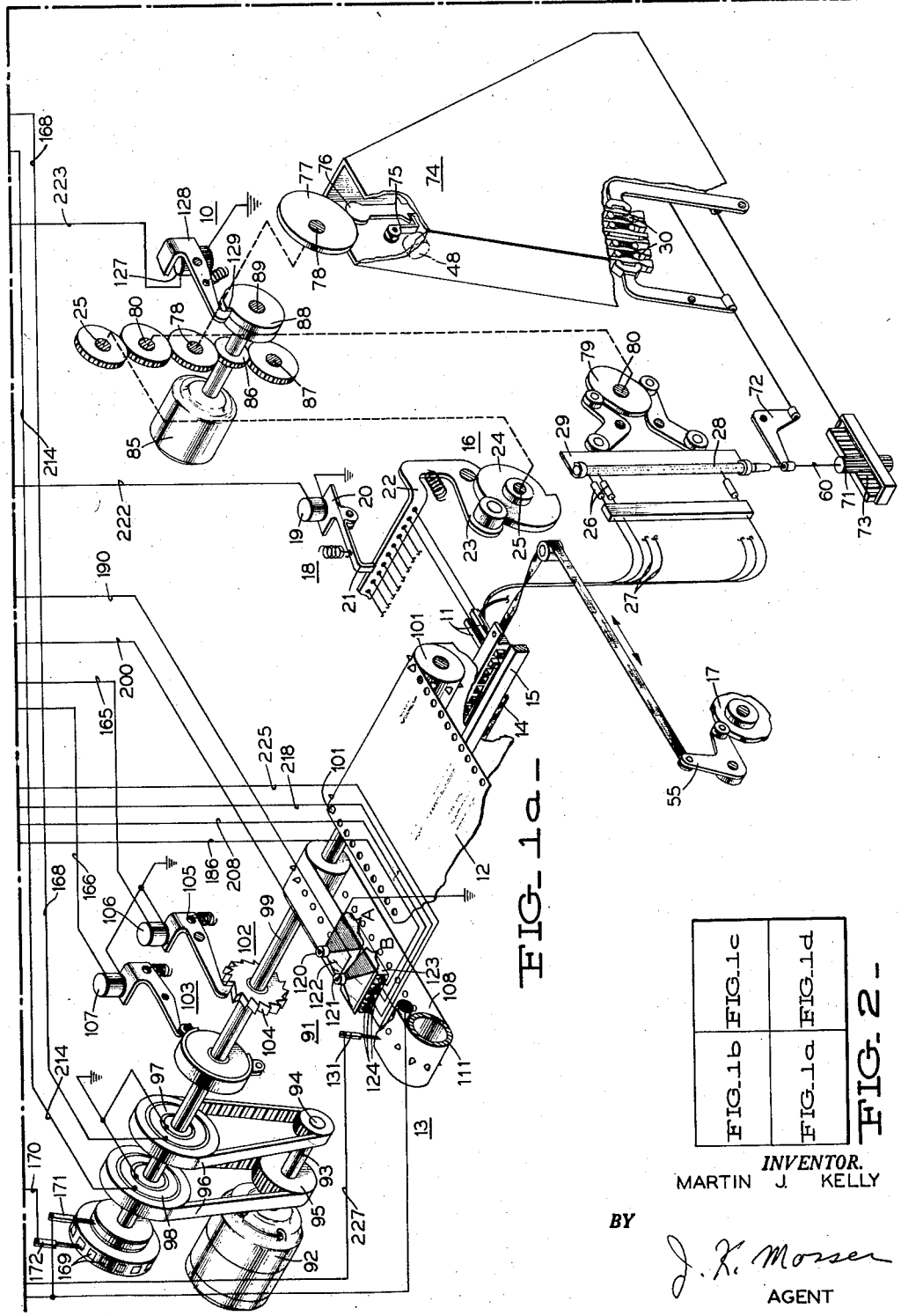

Figs. 7 to 10 diagrammatically disclose a portion of a form showing the printing of a line of data with four printing subcycles.

Fig. 11 is a timing diagram for a complete printing cycle.

Fig. 12 is still another timing diagram of the paper motion.

Fig. 13 is a graph showing the effective card rate versus skip distance.

Fig. 14 is a graph showing the lost subcycle versus skip distance.

Fig. 15 is a graph showing skip distance versus time.

TUBES AND CONTROL SWITCHES

In each of the drawings of the various control devices, the individual components or units making up that device are indicated merely as a box or block. The circuitry of such blocks will only be generally described as applied to various typical forms of tubes and diode circuits. A more detailed description of typical diode coincident switches, diode mixes, inverters, triggers, power tubes, heated gas tubes and any required cathode followers or the like which would be applicable to apparatus of this type is shown and described in O. B. Shafer et al. application, Serial No. 469,592, filed November 18, 1954, and assigned to the assignee of the present application.

For the purpose of this description, a typical coincidence switch 153, Fig. 1b, otherwise known as a logical And circuit or diode switch comprises germanium crystal diodes, each including an individual input terminal, normally biased negative so that the common terminal is normally at a negative potential with respect to ground. If coincident positive pulses are applied to all input terminals, the potential of the output terminal is raised. However, if only one of the input terminals is pulsed positively, the potential of the common output terminal is not raised appreciably. Any voltage responsive device, such as a suitable trigger T, Fig. 1c, or the like, may be controlled by the potential of the output terminal to furnish a usable output voltage pulse whenever a coincidence of positive input pulses is detected.

A typical mixer 158, Fig. 1b, otherwise known as a logical Or circuit or diode mix, comprises a pair of germanium crystal diodes. The diodes employed in mixers are shaded and the direction reversed in the present drawings to distinguish them from the diodes which are employed in the switches. A voltage responsive device, represented by a trigger T, Fig. 1c, is controlled by the potential of a common output terminal of the diodes, which terminal is connected by a suitable resistor to a negative voltage source, not shown, to normally maintain a negative bias in the related grid of the tubes. Each diode is connected to an individual terminal which in turn is connected in the electrical circuit. If either one or all of the diode input terminals is pulsed positively, the potential of the output terminal is raised which permits the tube associated therewith to conduct or operate in a predetermined manner.

Referring momentarily to Figs. 1b to 1d, inclusive, which represent diagrams of the control circuits, each of the component blocks or units, comprising a particular tube circuit, is labeled with a letter or combination of letters. The respective general or objective circuitry of most of the component blocks may be determined by identifying the letter-number block designation. Each particular letter combination in the component block, in addition to acting as a reference designation, also denotes the function of the component. Thus for example, a typical power unit or inverter is labeled with the prefix letter I; a trigger unit is labeled with the prefix letter T; a power amplifier unit is labeled with the prefix letters PW; and a gas tube or thyratron unit is accordingly labeled with the prefix letters GT.

Hereinafter in this specification wherein a conductor or a circuit terminal or the like is referred to as being shifted positive or negative in potential, this does not necessarily mean that the point in question is positive or negative in an absolute sense, but only more positive or more negative, relative to its previous state. This principle also applies to any description wherein positive and negative pulses are mentioned or referred to as up or down or raised or lowered.

Generally, an inverter or amplifier unit I comprises a triode having its cathode connected to ground. An inverter, as its name implies, is adapted to invert a signal. Thus if its grid terminal shifts positive, the triode conducts more heavily and the associated plate output terminal shifts negative. Similarly, if the grid terminal shifts negative, the output terminal shifts positive.

Power amplifiers or units PW effect 180° signal inversion of an applied signal so that they may also be classified as inverters. However, they differ from the inverter units, which are primarily voltage devices, in that they can supply considerable power to the circuits to which they are connected. In Fig. 1c the PW units comprise a triode tube wherein the application of a positive signal to the grid input terminal results in heavy conduction from a positive voltage source through the plate circuit and series connected relay coil to induce a magnetic flux therein for purposes to be hereinafter described.

The trigger unit T shown is conventional in construction and comprises two retroactively coupled triode sections. By proper selection of circuit components, the unit is so arranged that only one of the triode sections is conductive at a time in accordance with a well-known trigger operation. With the right-hand triode 40 conducting, Fig. 1c, the trigger is defined as being in an "off" or reset position. With the trigger "off," the output terminal of the right-hand triode is at some potential below the supply positive potential due to the current being drawn through the right-hand triode. As a result, voltage sensitive circuits which may be connected to this terminal are accordingly controlled. With the trigger "off," as assumed, the plate and output terminal of the nonconducting left-hand triode 50 is approximately at the positive supply potential.

The trigger shown utilizes a positive-going input selectively applied to the terminals S and R to flip the trigger from its "off" or reset to its "on" or set position and vice versa. Retroactive action between the related triodes is very rapid so that in effect the application of the positive shift to the terminal S almost instantaneously initiates the "flipping" of conduction from the right to the left-hand triode. A positive shift to the terminal R causes the opposite action. With the trigger "on," the plate of the left-hand triode 50, along with its output terminal, is at a low potential, while the plate terminal of the right-hand triode is at a relatively high positive voltage. With the shift of potential between the output terminals, associated circuits are accordingly controlled.

A heated cathode type gas tube unit or thyratron GT, Fig. 1d, generally comprises a plate connected to a positive voltage supply at the upper terminal and a cathode connected to ground at the lower terminal. This gas filled tube includes a pair of grid input terminals 63 and 64, respectively. Under normal operating conditions, the grid 64 is biased negative and the tube is cut off or nonconducting. If both grids are biased positive, the tube fires and conducts for reasons to be hereinafter explained and continues to conduct then in the standard manner until such time as the positive voltage supply is interrupted.

GENERAL DESCRIPTION

Referring now to the drawings for one embodiment of the improved control means to provide subcycle control for a serial-parallel type printer, there is diagrammatically shown in Fig. 1a a wire printer 10 which comprises a plurality of reciprocatable horizontally spaced print heads or mechanisms 11, only two of which are shown, disposed to impress the desired characters along a predetermined line on a paper record or form 12. The paper form is associated with a form feeding means or carriage 13 which passes the form behind a ribbon 14, and a stationary platen 15 disposed in line with the print heads and ribbon provides the proper backing for the printing operation.

The plurality of simultaneously operable printing heads 11 are arranged in transversely spaced relationship, each includes a presettable wire matrix which is moved toward and away from the record or form by a biased print actuating member 16 in each printing subcycle to effect printing strokes and laterally of the recording material by other means 17 between printing subcycle strokes to enable printing in successive character positions in successive subcycles, as shown in Figs. 7 to 10, inclusive. After a number of such subcycles, the printing of a complete line may have been affected by the concurrent operation of each of the print heads, as shown in Fig. 10.

Included with this mechanism is a means 18, Fig. 1a, for suppressing movement of the print heads 11 during certain of the machine timed subcycles and other idling periods in which no printing is to take place. This may involve periods when the printer is operating but no data is being fed to the printer or at times when the paper or form 12 on the carriage 13 is being advanced by a skip operation requiring more time than is normally provided between successive print strokes from the last printing subcycle to the first normal printing subcycle of the next printing cycle. Under these conditions, the print heads 11 are preferably held against movement.

Any suitable mechanism may be provided to selectively suppress the operation of a complete line of print heads. By way of example only, a print head suppression magnet 19 is shown associated with an armature 20 having a latch portion 21 which may be shifted into the path of movement of the print head hammer device 22. This device is operated by means of a spring biased crank arm 23 having a cam follower riding a constantly rotating print head drive cam 24 secured to a continuously rotating print head drive shaft 25 at a subcycle rate. Thus if the print head suppression magnet 19 is energized, the print hammer mechanism 22 is prevented from operating and the print heads 11 do not undergo an impact stroke. When the magnet 19 is de-energized, the latch 20 is not moved to interfere with the operation of the print hammer mechanism 22 so that printing may be effected in the printing subcycles.

The plurality of print heads 11 includes a plurality of print wires 26 slideably mounted in flexible guide tubes 27. These guide tubes are moved toward the platen 15 so that the projecting ends of the preset print wires 26 strike the paper form 12 to impress the character pattern. A code rod 28 is provided for each print head and is mounted on a print plate 29. Rapid and accurate indexing of each code rod 28 to the various character determining positions is accomplished by a bank of wedges or the like 30. Each bank of wedges has a positive displacement so that only a minimum of movement is entailed in moving the code rod from one position to another by merely advancing and restarting different wedges under control of related setup means or magnets 48, Figs. 1a and 1d. Each bank of wedges consists of two units of three wedges each having values of 1, 2 and 4, respectively, when moved to an operating position.

Each code rod 28, which may be of the type having seven positions in the angular direction and eight positions in the axial direction for a total of fifty-six character determining positions, is attached at its lower end to a flexible stem 60. The lower end of this stem has fixed to it an enlarged gear 71 through which rotation and translation is imparted to the code rod to index the same in any of its various character determining positions.

The vertical indexing of each code rod is effected by moving it downward from its normal position by a corresponding lever 72. Rotation of the code rod 28 to any of its desired positions is accomplished by a rack 73.

Positioning of the wedges 30 is affected by energizing the corresponding plate mounted magnets 48 identified as A, B, C, D, E and F, Fig. 1d, which cooperate with a common drive mechanism 74, Fig. 1a, connected to the wedge banks 30. Since there are six wedges on each bank, three being used for translating the code and three for rotating, magnets A, B and C, Fig. 1d, may be designated as those controlling rotation, and magnets D, E and F as those controlling translation. The pulsing of any one or more of these magnets will result in the disposition of a corresponding code rod 28, Fig. 1a, in a character determining position. Suitable pawls 75 are secured to the magnet armatures which in turn cooperate with a related slide bar 76 to effect operation of the wedges 30 which in turn act to set up the code rod 28 in the standard manner. The slide bars are continuously reciprocated at a subcycle rate by means of a setup cam 77 secured to a setup shaft 78. Likewise, the code rod 28 is continuously reciprocated toward and from the lower ends of the print wires 26 at the subcycle rate by means of a code rod bail cam 79 secured to a code rod bail drive shaft 80.

In operation of the printer, when the impulse or impulses to the setup magnets A, B, C, D, E and F are delivered, the cam 77 for the slide bars 76 of each setup plate assembly begins to depress those slide bars to position the wedges 30 on the basis of the pawls 75 which were moved into the slide bar path by the released armature latch arms. Through the interconnections between the wedges 30 and the code rods 28, the latter will simultaneously be indexed to differential positions indicative of particular characters. The code rod housing bails now move the code rods 28 against the corresponding print wires 26 to impart differential settings thereto. Thus as the code rod bail cam 79 becomes effective and moves the code rods fully against the print wires, the code rod bail cam almost immediately beings to recede so as to allow the print wires to move rearwardly during printing time. This printing time is effected by the cam 24.

In the meantime, the latch arms 75 are restored. The cam 77 begins its effectiveness before the time for the next pulses to the setup magnets. It can be seen that, while the code rod bail cam 79 is effective to transfer the information from the indexed code rods to the print wires 26, the setup magnets 48 are being conditioned with the information to be printed in the next subcycle and that as soon as the code rod bails have restored, the code rods 28 are indexed to new positions.

The characters or data to be printed on the forms 12 are delivered from a data source 81, such as a punched card, magnetic tape or the like, Fig. 1c, and placed in a buffer storage medium 82, such as a magnetic drum or core storage in any suitable manner. This data may be in coded form and involve one or more bits of information for each character. When required, certain characters in a line of data are delivered from the storage medium to a setup buffer readout transfer device 83, Fig. 1d, in a predetermined manner, dependent upon the type of printer operation, to actuate one or more of the setup magnets or the like 48 which are operative to position one or more wedges 30, Fig. 1a.

After setup of the character, the constantly rotating print head cam 24 operates through the crank arm 23 to drive the print heads 11 against the platen 15 and impress the characters on the form 12, as shown in Fig. 7. At this time the constantly running print head lateral motion shifting cam 17 operating through a bell crank and strap mechanism 55, shifts the print heads 11 to the next character or impression receiving position, as shown in Fig. 8.

As shown in Fig. 1a, a printer motor 85 continuously rotates the print head, bail and setup shaft 25, 80 and 78, respectively, through suitable gearing or the like 86 and also provides the basic subcycle control through a constantly rotating subcycle shaft 87. Extending from the motor output shaft is a printer clutch 88 of any suitable type which may rotate its output or driven control shaft 89 at a constant rate or be selectively disconnected and connected to the printer motor 85 in accordance with a control condition supplied from the carriage 13. The control shafts 87 and 89 are utilized, through the basic timing of the system, to aid in the synchronization of the printer 10 and carriage 13.

Since the particular detail elements of the printer 10 form no part of the invention, it is believed the above brief description is sufficient for an understanding of the invention. One form of wire printer to which the improved subcycle control is applicable is shown and described in the following applications.

The print head for impressing the desired character on the paper form may be of the type disclosed in Frank J. Furman et al. application, Serial No. 478,649, filed December 30, 1954. A suitable code rod for setting up the desired character is disclosed in Frank J. Furman et al. Patent No. 2,785,628, dated March 19, 1957. A means for actuating the print heads and suppressing the printing operation may be of the type disclosed in Frank J. Furman et al. Patent No. 2,829,592, dated April 8, 1958. The mechanism for setting up the desired character in a print wire is shown and described in Frank J. Furman application, Serial No. 479,106, filed December 31, 1954. A means for providing a read out of data to be printed in a preselected manner is disclosed in H. A. Jurgens et al. application, Serial No. 479,107, filed December 31, 1954. All of the above applications are assigned to the assignee of the present invention.

While a serial-parallel wire type printer is disclosed, other types of printers, such as stick printers or the like, operating on a serial or serial-parallel basis having subcycle printing steps to complete a line of data could be utilized equally as well.

Since the invention is not directed to any particular type of carriage structure or control therefor for controlling paper movement, any of the carriages disclosed in the following patents and applications would, with suitable modifications, be applicable: A. W. Mills et al. Patent 2,531,885, dated November 28, 1950; J. H. Bakelaar et al. Patent 2,684,746, dated July 27, 1954; F. J. Furman et al. Patent No. 2,842,246, dated July 8, 1958; and J. M. Cunningham et al. Patent No. 2,747,717, dated May 29, 1957. All of the above patents and applications are assigned to the assignee of the present invention.

In the particular embodiment shown, a carriage of the type described in the above Cunningham application is diagrammatically indicated. However, it is to be understood other suitable carriages could, with relatively minor changes, be made to perform the necessary steps or functions.

The carriage device 13, Fig. 1a, associated with the printing mechanism 10 may be of any basic design modified as will be hereinafter described. By way of example only, there is shown a five channel control tape or the like 91 for the carriage which is operated in synchronism with movement of the paper form. As shown, a carriage drive means or motor 92 continuously rotates a shaft 93 having a pair of pulleys 94 and 95, respectively, secured thereto. These pulleys each include a belt or the like 96, one of which is associated with a low speed clutch 97 and the other with a high speed clutch 98. The output or driven side of the clutches is secured to a driven or carriage shaft 99 and each clutch is adapted to be independently actuated to selectively rotate the carriage shaft 99 at a low speed or at a high speed, dependent upon predetermined conditions.

Associated with the carriage shaft 99 in any suitable manner and to rotate therewith are a pair of spaced tractor wheel elements 101 having projecting pins for advancing the paper record or form 12 past the platen 15 at any preselected rate. As shown, the projecting pins on the tractor enter equally spaced perforations in the form 12 so that any motion of the tractor imparts a similar motion to the form. When continuous type forms are utilized, a feed hopper, not shown, is provided to supply the forms and a receiving hopper, not shown, is utilized to receive the printed forms.

A line spacing or detent mechanism 102 and a brake 103 are associated with the carriage shaft 99 to hold the same stationary during the interval when printing is taking place. The line spacing mechanism 102 may include a ratchet wheel 104 and detent 105, the latter being operated under the control of a detent magnet 106. A brake magnet 107 may be provided for controlling operation of the brake 103 to grip and hold the shaft 99 stationary, while the detent 105 maintains proper alignment of the line on the form 12 with respect to the print heads 11. A control mechanism 110, Fig. 1c, is provided to operate the clutches and detent in a predetermined manner.

In addition to the paper advancing and aligning means, the carriage shaft 99, Fig. 1a, is also adapted to drive a control tape 108 in synchronism with the form movement. The control tape 108 may be of the multichannel endless belt type as described in the above-mentioned carriage control patents and applications. In order to simplify the description and aid in the understanding of the invention, the number of channels has been reduced to five. These may be defined as the heading, body, total, skip and overflow channels 111, 112, 113, 114 and 115, respectively, as shown in Fig. 6. Of course, any number of channels may be incorporated to accomplish the desired carriage and printer operation. In this instance, the five channels in the tape 108 each include a control punch or perforation 109 so disposed as to provide the first heading, body and total line locations 116, 117 and 118, respectively, for the particular form 12 being printed as shown in Fig. 5.

Associated with the tape 108 for detecting the perforations in the channels when they lie within predetermined areas or zones A and B are a pair of photoelectric cells 120 and 121, Fig. 1a, which are spaced a suitable distance from the tape. Between each photoelectric cell and tape is a light guide or directing device 122 which may be formed from Lucite or the like. Below the tape 108 and extending longitudinally along each channel is an elongated enclosed chamber 123 having an incandescent light source or the like 124 therein. Thus if any one of the lights in the chambers is energized, and the perforation in the selected channel is within the area encompassed by the A and B zones, the light will be conducted to one or the other of the photoelectric tubes 120 or 121 by means of the related light guide 122. The output from these tubes is directed and utilized by the carriage control means 110, Fig. 1c, in a manner to be hereinafter described. The above photosensitive carriage control is more fully described and claimed in F. Saltz application, Serial No. 579,763, filed July 13, 1956, and assigned to the assignee of the present invention.

There is shown in Figs. 1a to 1d a schematic wiring diagram of a control means for operating the carriage 13 at low and high speeds and to provide the subcycle control for the printer 10. Since controls of this type are generally quite complex to accommodate for various operating conditions, the circuit has been simplified or idealized by eliminating certain portions thereof in the interest of clarity of presentation.

As shown in Fig. 1a, the rotating printer motor 85 continuously rotates the print head, bail and setup shafts 25, 80 and 78, respectively, along with the subcycle timing shaft 87 which is operative to continuously rotate the subcycle and printer clutch run cams 125 and 126, respectively, Fig. 1c, to make and break their respective cam contacts C125 and C126, respectively, once for each subcycle or printer operation. The number of printing subcycles in a printing cycle will depend upon the number of serial impressions to be made by each print head 11, Fig. 1a. For example, if a 120 character line is desired and thirty print heads are incorporated in the mechanism each print head must perform four subcycle printing operations serially to complete the line of data, as shown in Figs. 7 to 10, inclusive. Likewise, a 24 head wire printer must perform five serial printing operations to complete the line of data.

The disclosed high speed carriage 13, Fig. 1a, utilizes two paper eject speeds, a high speed of seventy-five inches per second and a low speed of twenty-five inches per second. Thes speeds were attained by the operation of the magnetic friction clutches 97 or 98. When either clutch magnet is energized, its associated armature, not shown, is attracted and thus transmits the rotation of the magnet to the carriage shaft 99. The paper motion is stopped by energizing the friction brake 103, and the electrically operated detent 105 provides the positive stop and print line location.

The maximum paper speed at which the brake 103 and detent 104 are activated is twenty-five inches per second. Thus if a skip is performed in high speed, it is necessary to decelerate to low speed before applying the brake and detent. This is accomplished by transferring control from the high speed clutch 98 to the low speed clutch 97, 1⅛ inches before the brake is applied.

The slowdown and stop controls are provided by the carriage control tape 108. In the example given, the printer clutch 88 selectively connects the cam operating the driven shaft 89 corresponding to the number of subcycles in the printing operation. In this instance, a printer clutch magnet 127 is energized at all timed subcycles by means of the cam contact C126, Fig. 1c, which attracts an armature 128, Fig. 1a, away from a projecting shoulder 129 to maintain the printer cam shaft 89 engaged and rotating with the subcycle shaft 87. The basic timing for the magnet 127 is shown in Figs. 3 and 4. At the end of any complete printing cycle, failure to operate the armature 128, Fig. 1a, causes disengagement of the printer control cam shaft 89 and further printer operation will be terminated in a manner to be hereinafter described.

As previously mentioned, in this example the serial-parallel printer consists of thirty wire printing positions arranged for front printing and each print position shall be capable of printing four characters per line. The result is a printed line of 120 characters. Multiple printing by each head 11 is accomplished by the lateral motion of the print heads during the printing cycle with the direction of motion reversed on alternate cycles. Thus printing takes place while the heads traverse in either direction. This printer is intended for use with a variety of input media and is therefore stripped to its basic essentials as a unitized element.

The use of a serial-parallel printer imposes the following design conditions on the system:

The auxiliary buffer storage device 83, Fig. 1d, is necessary to provide the information sequentially to the print heads 11, Fig. 1a, as they progress across the paper. This buffer storage is normally not a part of the basic printer but would be of a design particular to the input system used with the printer.

The setup and printing mechanism must be operated at an elevated rate because of their multiple usage. Thus the printer must operate at much higher speeds than an equivalent parallel printer with the same number of lines per minute output.

Because the serial-parallel printing operation requires a major portion of a given machine cycle, the time allotted for paper motion is greatly reduced as compared to the paper transport time available with an equivalent parallel printer.

The form feeding device or carriage should be capable of the following operation: Single, double and triple space and skip a maximum form length of 3½ inches without loss of a machine cycle or portion of a cycle. In this example, approximately seventy-five milliseconds should be allowed for paper movement. With this time available, setup and printing in four positions with each print head requires print head operation at a rate of 2,400 times per minute.

Fig. 11 shows how each machine or complete printing cycle is subdivided into six subcycles, each of which is twenty-five milliseconds in duration. This cycle lasts 150 milliseconds, 75 milliseconds for paper movement in the carriage and 75 milliseconds to complete the four printing strokes. From the labeling of the chart, it can be seen the print heads 11 move from left to right and print in positions 1, 2, 3 and 4 on one cycle and then on the next cycle move from right to left and print in positions 4, 3, 2 and 1.

It is evident that if paper movement is not completed by the first print time in a machine cycle that the action of the print heads must be interrupted momentarily to allow for completion of paper movement. One such interruption system could be to latch up the action of the printer for a complete 150 millisecond machine cycle and test to see whether the paper is stationary at the end of this interval. This system, of course, reduces the output of the printer radically when skips longer than those possible in seventy-five milliseconds occur. Such skips would be of 3½ inches or more. Another scheme for holding up the action of the printer would be to latch up the device if the paper is still moving at the first normal print time and test each subsequent subcycle to see whether it is possible to start the print action. Loss of one subcycle for example will reduce the output from 400 to 342 lines per minute, loss of two will reduce it to 300 lines per minute, and so forth, as shown in Figs. 13 and 14. From this it can be seen that interrupting the printer action in subcycle increments minimizes the time lost on long skips.

Fig. 3 explains the timing of the printing system including the setup pulse and the mechanical components in the setup and printing mechanisms. When the printing cycle is held up for paper movement, as arbitrarily shown in Fig. 4, it is preferable to prevent the characters from being set up in the print heads by holding up the pulses delivered to the setup magnets 48. In the proposed setup mechanism the carriage control system holds up the printing action in the case of a long skip before the pulses are delivered to the setup magnet. Thus considering only the mechanics of the printer, the carriage control 110, Fig. 1c, must influence the print setup forty milliseconds before the first print time.

As stated previously, the time allotted for paper motion is 75 milliseconds of the 150 milliseconds total machine cycle. A nominal safety factor of ten milliseconds reduces this time to sixty-five milliseconds. Therefore, the carriage must operate at a rate which is equivalent to that of a carriage used with a parallel printer operating at 1,000 lines per minute.

The basic functions of which the carriage must be capable are listed below. The selection of these functions or the successive operation of a series of functions result from a specific signal or series of signals which have their origin in the machine with which the printer and carriage are used.

(1) *Spacing.*—Single line space for normal operation. Double or triple spacing under plugboard control. The time required for single, double or triple spacing is well within the sixty-five millisecond normal paper movement time.

(2) *Space suppression.*—Suppress carriage operation for a complete machine cycle, under plugboard control.

(3) *Skip.*—Start from any point on a form and stop under tape control.

(4) *Overflow.*—Tape controlled signal from the carriage to indicate the last printing line of a form.

(5) *Print control.*—A carriage controlled signal to cause the printer to suspend operation for any number of subcycles, as required for skips greater than 3½ inches.

The basis of the method described for carriage control is the use of the time of the machine cycle available before actual paper motion time. This time is used to operate comparatively slow acting circuit elements which determine the stopping conditions of the carriage. The carriage operation is always initiated by a single start pulse. This start pulse is sufficiently delayed in the machine cycle to allow selector control of the stopping conditions.

The nature of the carriage drive dictates a two speed device. To skip long distances in a minimum amount of time requires high speed operation. It is not advisable to stop the motion of the paper during high speed operation. Therefore, it is necessary to slow the paper down to the low speed before stopping. The time required to slow down has been arbitrarily related to the maximum distance which can be skipped at a low speed. These relationships may be seen in Fig. 15.

If the control hole punch 109, Fig. 6, in the selected channel of the tape, is within 1⅙ inches of the stopping point, the paper must be either moving at low speed or in the transition between high and low speed, as shown in Fig. 12.

The serial-parallel nature of the printer disclosed limits the paper motion time to sixty-five milliseconds. As shown in Fig. 15, a maximum of 3½ inches of paper motion may be achieved in this time. If the skip is longer than 3½ inches, the carriage provides a means of delaying the operation of the printer 10 until the paper has reached some predetermined position. The mechanism of the printer is such that the signal which starts the operation of the printer is received when the paper is 3½ inches from its stopping point. Thus each tape channel must be provided with a means of storing the fact that the hole in the channel has passed the point 3½ inches from the stopping point even though only one channel is considered during a particular machine cycle.

Fig. 1a discloses a method of generating the desired control signals from the punched tape 108 by the use of the photomultiplier or electric cells 120 and 121. Since allowable time for operation is sufficient, the use of the incandescent lamps 124 is permissible for each channel. The light is collected in the two optical light gathering and guide units 122, one of which monitors an area of the tape, the length of which extends from 1⅓ to 3½ inches from the stopping point. This will be referred to as the A zone. The other light guide has an area extending from ⅙ to 1⅙ inches from the stopping point. This will be referred to as the B zone. The width of the area in each case is sufficient to cover the desired number of channels. The optical system described provides a means of eliminating the need for information storage for each channel.

A brush 131, Fig. 1a, is provided for the overflow indication in the overflow channel 115, Fig. 6.

Figs. 3 and 4 show the basic timing relationships between the drum storage readout, print head motion, printing and paper transport by the carriage.

The magnetic drum storage unit 82, Fig. 1c, and the required switching circuits provide the stored information to the printer in the proper timed sequence. It is not necessary that the drum be mechanically synchronized to the printer. This fact enables the use of the methods for other means of storage such as electrostatic or tape. The digit or column information on the storage drum or medium 82 is associated with a timing ring system 132, Fig. 1d, which receives its basic timing pulses from a timing track 133 on the drum. After every print cycle, during paper transport time, the ring system is reset to a home position. In this manner random errors in ring operation are not carried over from line to line of printing. A marker pulse which locates column one of the storage track is received before the rings again start operation. The marker spot may be permanently on the drum or it may be written on simultaneously with the first bit of the first digit entered in the storage track. This facilitates read-in to the drum in that the location of the first digit is no longer fixed but may be any arbitrary location on the drum periphery.

In this manner column one of the stored information is associated with position one of the timing ring system 132 and each successive stored digit is located by a specific timing ring position. Because of this association, it is not necessary that the drum readout, for any given print cycle, begin at a specific point in the drum revolution. The readout may start at any arbitrary time of the drum cycle and the starting point may change from print cycle to print cycle.

As shown in Fig. 3, the drum must make at least one complete revolution during the time each setup emitter pulse supplied by the cam contacts C134, C135, C136 and C137 is present. This is associated with each print position. During the emitter pulse time, every fourth digit is read out to the printer as described in the above-mentioned application, Serial No. 479,107. At the end of the fourth emitter pulse, all the information stored in the drum has been printed.

The control cam contacts C134, C135, C136, and C137, Fig. 1c, mechanically operated by the clutched control shaft 89, in effect, provide the necessary synchronization between the electronic circuit action and the printing mechanism.

The information is stored on the drum 82, Fig. 1c, serial by bit, serial by column per track. A timing ring of eight, 138, Fig. 1d, provides the necessary pulses to the print unit gas tubes 140 to effect the serial to parallel conversion. The ring of eight supplies pulses to the print gas tube screen grids 63. The resulting action is that of a serial to parallel converter. Each excursion of the ring of eight conducts over a line 150 and causes the ring 139 of 160, Fig. 1c, to step one position. Thus the ring of 160 transfers for each digit. The ring of 160 may be selectively plugged to 120 relay points 141, which represent 120 columns of printing. The emitter cam contacts C134 to C137 select which of each group of four related points are closed. The selected relay points determine which of four digits is read into the print unit by providing the necessary print gate pulse. Fig. 3 shows the timing relationships between the switching circuit and the printer action.

By suitable interconnection, any of the digits on the drum track can be delivered for printing in any of the character positions of a line, there being four input hubs 147, Fig. 1c, for each print mechanism for inputs in as many subcycles. Since a particular print mechanism and print head can accommodate only one character at a time or subcycle, or any of four characters in any of four subcycles, the subcycle select cam controls C134 to C137 are provided to permit the read out of only one of the four possible digits to each print mechanism in a subcycle. The subcycle select control, however, automatically advances in orderly sequence so that in successive subcycles the other of the four digits will be printed.

As observed earlier, each print mechanism is controlled by the six magnets A, B, C, D, E and F, Fig. 1d; since there may be thirty print mechanisms in a printer, there are thirty sets of six magnets each. The energization of each of these magnets is controlled through the firing of the associated two-grid controlled gas tube 140. Thus there are thirty sets or banks of six gas tubes each, one bank for each print mechanism or print head 11.

The printer is operated on a combinational code having six bits X, 1, 2, 4, 8 and 0, and any one or more of these six bits or impulses may designate a character. The reading out of the information from the magnetic drum is controlled by the printer. At a fixed time in each subcycle, a cam contact C142, Fig. 1c, is operated to close a storage gate 143 in the circuit with the read head for the information track. The closing of this gate connects the read head with a coincidence diode switch 144 having an output line 148 leading to a bit distributor 149, Fig. 1d, which hence receives the information serially by bit and digit. The seven stage closed bit ring 138, advanced by the reading of the permanent spots on the synchronizing drum track 133, is continually operative to transmit pulses in proper time sequence with the reading of the bit spaces on the information drum track. It transmits separate pulses over separate lines to seven coincidence circuits in the bit distributor. Coincidence between any of these seven bit ring fed pulses and an information bit results in a conditioning of the related thyratron 140 in each print mechanism bank. Only one of the thirty possible thyratrons may be fired at this time, however, this is the one whose other grid is currently being biased.

The control grids for a bank of thyratrons may be thus conditioned so that the thyratrons will receive any digit in any subcycle by properly plugging the corresponding storage exit hub with the particular input hub 147, Fig. 1c, that is connected in that subcycle with the thyratrons.

A gas tube fires when both grids are conditioned. Since the bit pulses emanating from the bit distributor 149, Fig. 1d, are momentary and control pulses emanating from an exit hub are only slightly longer involving, namely, the time necessary for the seven individual bit pulses of a digit, provision is made to hold the gas tubes 140 by heater resistors by closing cam contact C145. Thus the conditioned gas tubes 140 remain conductive while the read out of the rest of the information is accomplished.

After a time sufficient to transfer all of the information to the gas tubes, magnet cam contact C146 closes to connect the gas tubes with the magnets 48 of the respective print mechanisms. This results in the pulsing of those print magnets whose corresponding gas tubes have been rendered conductive and constitutes the print magnet pulse time. The pulse time is terminated by the opening of printer controlled cam contacts C145 and C146 in the plate circuits for the gas tubes, resulting in the latter's extinction.

The information which has been transferred to the sets of print magnets 48 is then transferred to the corresponding code rods 28, Fig. 1a, for the corresponding print mechanisms. Thereafter, the preset print wires are moved against a platen to effect printing in every fourth print position across the line currently being printed.

In the meantime, printer control cam contact C135, Fig. 1c, has operated to advance the subcycle select control. This operatively connects the second of each set of four printer input hubs with one of the grids of the corresponding bank of gas tubes 140, Fig. 1d, so as to enable their setting up the characters which are to be printed in the print positions adjacent those just being printed. Thereafter, the cam contact C142, Fig. 1c, controlling the readout gate 143 again closes to permit the transfer of information to condition the print mechanisms anew.

The process described above for the first and second subcycles would be followed to effect the third and fourth subcycles. By this time a complete line of printing has been effected as shown in Fig. 10 to finish the particular print cycle.

In the next or second cycle and in alternate future or even numbered cycles, the print heads are shifted laterally from right to left to print the information in the reverse order that they did in the first cycle. Thus where formerly the print heads first printed the first of four following characters, the print heads now print the fourth of four preceding characters. In order to accomplish this, an inverter control is embodied with the subcycle select control. This inverter control, which may include the printer controlled cam contacts C134 to C137, Fig. 1c, reverses the order in which the subcycle select control is effective to connect each set of four input hubs to the corresponding print gas tubes. At the end of the four subcycles, that is, the second cycle, the inverter control will again reverse the subcycle select control so that they then operate in the first-described order.

OPERATION

Assuming the carriage 13, Fig. 1a, is at rest with the desired heading line 116, Fig. 5, in position adjacent the platen 14, Fig. 1a, ready for the first subcycle printing operation, the detent 102 on the carriage will be engaged to insure proper spacing and the brake 103 is applied to hold the paper form 12 stationary. As the carriage was approaching the above stop location, the first print position cam contact C134, Fig. 1c, closed to operate its related relay R134 and transfer the associated contacts 141 for directing the selected data to the various print heads for that particular print position.

During this interval, the storage gate cam contact C142 closes to feed a positive value to the storage gate diode switch 143, which gates the entire line of data to be printed to the print head diode switch 144. The timing rings 139 and 138, Figs. 1c and 1d, operated from the timing track 133, cooperate with the line of data delivered to the print head diode switch 144, Fig. 1c, to gate the proper pulses which arrive serial by bit and digit to the storage gas tubes 140, Fig. 1d. In this example, these gas tubes are coded to represent certain values and work in combination to provide the proper code rod movement.

When the storage gate cam contact C142, Fig. 1c, closes for the first print subcycle, the gas tube plate cam contact C145, Fig. 1d, also closed to condition all of the gas tube plates. Wherever coincidence occurs at the control and shield grids 63 and 64, respectively, of any of the gas tubes 140, that tube fires and continues to conduct after the control pulses are removed in the standard manner. In each group of six gas tubes, one or more of the same may remain conducting.

Each of the tubes 140 is associated with an independent setup magnet 48, which, when energized, is directly operative to contribute to the shifting of the analyzer mechanism or wedges 30, Fig. 1a, as set forth in the above-mentioned application, Serial No. 479,107. Operation of the magnet pulse cam contact C146, Fig. 1d, occurs after read-in of data to the gas tubes and any of the conducting gas tubes completes the circuit for the related magnet. After set up of the code rod 28, Fig. 1a, by operation of the magnets 48, the bail cam 79 shifts the code rod laterally and generates the desired character at each print head. Next the print heads are simultaneously driven against the form 12 and one fourth of the line has been printed.

As the code rod 28 is returned to normal, the data for the next print head position is being set up in the storage gas tubes 140 as previously described. In the example, the operation of the storage gate cam contact C142, Fig. 1c, and other basic timing occurs every twenty-five milliseconds. Thus the various mechanisms operating at a subcycle rate must complete their respective functions and be ready to repeat within the time allotted in the proper timed relation.

After the print heads 11 are driven against the paper form 12, they are retracted. As retraction occurs, the rotating cam 17, Fig. 1a, simultaneously shifts the print heads to the next character receiving position. By this time the code rod is laterally shifted to set up the wires for the second subcycle printing operation.

This same setup operation and lateral shifting of the print heads 11 is repeated for the third and fourth printing subcycles. All during this interval, the carriage 13 is held stationary.

As the fourth printing subcycle is completed, a carriage start pulse is generated by closing of the print carriage start cam contact C151, Fig. 1b. This provides a positive value over a line 152 to low speed, high speed and low speed skip diode switches 153, 154 and 155, respectively. Since the C pulse line 156 is open at this time, an inverter 157 provides a positive output to the low speed diode switch 153. This switch provides a positive value through a low speed diode mix 158 and related conductor 160 leading to the terminal S to turn "on" or set the low speed trigger T1, Fig. 1c. Turning "on" of the low speed trigger T1 raises the related output line 159 leading to the low speed power tube PW1 to cause the same to conduct. At the same time this positive value is directed through the diode mix 161 and applied to the terminal R of the detent trigger T3 to reset or turn the same to its "off" position. Turning "off" of the trigger T3 drops the related output line 162 and cuts off the power tube PW3, which in turn reacts through detent and brake relays R163 and R164 to open the related contacts R163a and R164a, to de-energize the detent and brake magnets 106 and 107, respectively, Fig. 1a, over the conductors 165 and 166, respectively. Deenergization of the detent and brake magnets releases the carriage shaft 99 and energization of the low speed clutch relay R167, Fig. 1c, by conduction of the tube PW1, closes contact R167a to energize the low speed clutch 97, Fig. 1a, over a conductor 168 in any suitable manner.

Energization of the low speed clutch 97 immediately causes rotation of the carriage shaft 99. As the carriage shaft begins to rotate, the form to be printed is advanced and one of the line spaced segments 169 on a commutator 171, secured to the shaft 99, passes under a brush 172 to complete a circuit over a conductor 170 to a suitable pulse shaper 173, Fig. 1b. This pulse shaper merely provides a positive going value to a detent diode switch 174. At the same time, a line space output device or counter 175 applies a positive value to a line space diode switch 176 which has one side thereof connected to the C pulse line 156 through an inverter 177. The output from the switch 176 conducts through a diode mix 178 and provides coincidence at the brake diode switch 174. A positive output from this latter switch 174 is applied over a conductor 180 to the trigger T3, Fig. 1c, to set or turn the same "on."

As trigger T3 turns "on," the positive output over the line 162 to the power tube PW3 causes the same to conduct and this energizes the detent and brake relays R163 and R164 to close their related contacts. This positive value on the line 162 is also directed through a diode mix 179 to the low speed trigger T1 to reset the same to its "off" position. As trigger T1 turns "off," the output over the line 159 drops to cut "off" power tube PW1 and de-energize the low speed clutch relay R165. De-energization of the low speed relay R165 operates to disconnect the carriage shaft 99 from the carriage drive motor 92, Fig. 1a, and energization of the brake and detent relays R164 and R163, respectively, Fig. 1c, operates to energize the magnets 107 and 106, respectively, Fig. 1a, to lock the carriage shaft 99 and hold the form 12 stationary at the first line after its starting point for the next printing cycle, which, of course, includes the proper number of printing subcycles.

Since double and triple line spacing functionally operate in the same manner, no description or circuitry is deemed necessary for an understanding of the invention.

Also if desired, a manual space key or switch 181, Fig. 1b, may be provided to manually line space or eject the form 12 by applying a positive value or pulse to the diode switch 153 over the line 152. During regular line spacing operations, the tape control 91, Fig. 1a, performs no function.

The channel lights 124 associated with each channel on the control tape 108 are under the direct control of a channel selector mechanism indicated generally by the box 182, Fig. 1b. Since the type of channel selector and its controlling function forms no part of the invention, a detail description is not deemed necessary. A mechanism of this type is disclosed and claimed in the above-mentioned Mills et al. Patent 2,531,885. As shown, a plurality of manually operable switches 183 have been provided to make the various channel selections, if desired.

The channel selector 182 operates in association with the tape control unit 91, Fig. 1a, and is operative under the control of the master and detail records or other material to position the form 12 in the proper location for the next printing operation. For example, assuming the data to be supplied to the printer involves that normally required for the printing of the heading, the signal for advancing the next form to the first line 116, Fig. 5, on the heading may occur some time during the printing of the last line of the previous form. Thus a pulse is delivered over a line 184, Fig. 1b, to the pick coil portion of the heading selector relay R185 which closes all of the related contacts. Operations of this relay close the hold contact R185a to hold the heading relay transferred. Transfer of the channel light contact R185b completes a circuit over the conductor 186 to the related heading channel light 124, Fig. 1a, and energizes or illuminates the same. At the same time, the overflow contact R185d, Fig. 1b, opens to open the overflow circuit and contact R185c closes the C pulse line 156 to raise the same.

Raising of the C pulse line 156 acts on the inverters 157 and 177 to drop one side of the related diode switches 153 and 176, respectively. At the same time, one diode each of the high speed clutch B zone and print suppression diode switches 154, 187, Fig. 1b, and 188, Fig. 1c, respectively, are conditioned. As the heading channel light ignites the operation of the carriage 12 will be directly dependent upon the location of the control perforation 109 in the heading channel 111, Fig. 6.

For the purpose of this description, it will be assumed the first line of the heading 116 is located somewhere within 1⅙ inches of the desired printing position when the heading channel 111 was selected and the carriage start cam contact C151, Fig. 1b, closed at the end of the last subcycle printing operation.

Operation of the heading channel relay R185 occurs as described above and the diode switches associated with the C pulse line 156 are driven up or down, as the case may be. As soon as the heading channel light 124 ignites, Fig. 1a, the perforation 109 in the tape permits a portion of the light to pass therethrough. The light striking the B zone light guide 122 is directed upward to the photoelectric cell 121, which responds and sends an electrical signal over a conductor 190 to a related pulse shaper or the like 189, Fig. 1d. This device includes an output or B line conductor 191 leading to various diode switches and mixes.

As the positive value leaving the shaper 189 passes through a print suppression diode mix 192, it operates an inverter 193 whose output 194 goes negative and drops one element of the print suppression diode switch 188. Dropping of the line 194 indicates that the carriage 13 will have sufficient time to advance the form the desired distance by the time the next scheduled printing subcycle takes place. Therefore, the printing mechanism continues in operation for code rod setup and the like at its regular rate. At the same time, the positive value applied to the B line 191 feeds to two inverters 195 and 196, Fig. 1b. The first inverter 195 is effective to drop one side of the high speed clutch diode switch 154. This indicates the carriage will have sufficient time to advance the form to its proper position at the low speed rate. The second inverter 196 drops a skip brake diode switch 197 which is also connected to an output line 198 of a trigger T4.

Since the C pulse line 156 is positive, the line space diode switch 176 is held open by the related inverter 177. Thus the detent diode switch 174 is held open regardless of the number of line space pulses supplied thereto over the line 199. The B pulse line 191 is connected to the diode switch 187 which also connects with the C pulse line 156. The coincidence positive values now at this switch 187 provide an output over a conductor 201 to the low speed skip diode switch 155 and at the same time sets the trigger T4 to raise one side of the skip brake diode switch 197 by means of the conductor 198. Diode switch 155 is also connected to the carriage start line 152 and coincidence at this point provides an output through the diode mix 158 to set the low speed clutch trigger T1, Fig. 1c. Setting of the low speed clutch trigger T1 operates the low speed clutch relay R165 to energize the low speed clutch 97, Fig. 1a, as previously described. Flipping of the trigger T1, Fig. 1c, also provides the positive value through the diode mix 161 to the detent trigger T3 to reset the same, which action releases the detent and brake 106 and 107, respectively, Fig. 1a, to permit carriage movement at low speed as previously described. During this advance of the form, the line space commutator pulses delivered by brush contact with the commutator segments 169 are blocked at the diode switch 174, Fig. 1b, and the line space pulses are blocked at the line space diode switch 176 by the condition of the inverter 177.

As the form 12 and tape 108, Fig. 1a, continuously advance at low speed, the control perforation 109 in the heading channel 111 eventually leaves the B zone and the heading channel light is cut off from the B zone light guide 122. This immediately drops the output of the B line 191 and the output of the inverter 196, Fig. 1b, is driven positive. The other input element of the diode switch 197 is held positive by the line 198 extending from the trigger T4, now in its set position. Coincidence at the diode switch 197 provides an output extending through the diode mix 178 to the detent diode switch 174. As the next commutator pulse arrives over the line 199, coincidence at the diode switch 174 provides an output over the line 180 to set the detent trigger T3, Fig. 1c. Operation of the detent trigger T3 drives its output line 162 positive leading to the power tube PW3 to reapply the detent and brake 102 and 103, respectively, and continues through the diode mix 179 to reset the trigger T1, which in turn de-energizes the low speed clutch 97, Fig. 1a, by cutting off its related power tube PW1, Fig. 1c. Setting the trigger T3 drops a line 202 extending to an inverter 203 to provide a positive value over the line 204 to reset the trigger T4, Fig. 1b. Resetting trigger T4 drops line 198 to open diode switch 197. At some portion of the printing cycle, the channel selector hold cam contact C205 opens and drops the heading relay R185 to return all of the related contacts to normal. This extinguishes the heading channel light 124, Fig. 1a.

The first heading line 116 on the form is now in position to receive the first subcycle printing operation, which is timed to take place in the previously described manner with no delay. Line spacing then continues after each group of printing subcycles upon every operation of the carriage start cam contact C151, Fig. 1b, in the standard single, double or triple space manner.

When one of the next control cards or the like is detected by the printer, this indicates that the last line in the heading is being printed. A control signal is directed from the channel selector 182 to instruct the carriage to move to the first line 117 of the body in the form, Fig. 5.

As the body selection is made over a conductor 206, this action energizes the body relay R207 to close the related contacts in the same manner as the heading relay R185. Except in this instance, the transferred relay contact R207b energizes its related body channel light 124, Fig. 1a, over the conductor 208. For the purpose of this explanation, it will be assumed the first line 117 of the body, Fig. 5, on the form 12 happens to lie somewhere between 1⅓ and 3½ inches from the desired printing position when the selection is made. Thus the related control perforation 109 in the body channel 112, Fig. 6, will lie somewhere in the A zone covered by the related light guide 122, Fig. 1a, thereabove leading to the A zone photoelectric cell 120. The area covered by the photoelectric cell 121 in the B zone remains nonresponsive.

Operation of the body channel selection also raises the C pulse line 156 by closing contact R207c, Fig. 1b, to condition the same in the previously-described manner. The light passing through the heading control perforation is directed to the photoelectric cell 120 which in turn provides a signal over a conductor 200 to the related shaper 189, Fig. 1c. The output from this shaper extends over a line 209, through the diode mix 192 and related inverter 193 to hold the print suppression diode switch 188 down. This action, like that previously described for the photocell 121 in the B zone, indicates to the printer suppress control mechanism 211 that the carriage will be capable of advancing the form to the first body line 117 in time to receive the first subcycle printing operation, without requiring printer delay. Accordingly, the code rod setup mechanism continues to operate at its regular timed rate. However, the carriage 13 must operate at high speed for at least a portion of the allotted time to accomplish the desired form movement.

Due to the absence of the control perforation in the B zone, Fig. 1a, the line 190 and the B line 191 remain down and this condition acts on the inverter 195, Fig. 1b, to condition one portion of the high speed clutch diode switch 154. Closing of the C pulse contact R207c conditions another portion of the high speed diode switch 154 by means of the C pulse line 156 and as the carriage start pulse arrives over the line 152, upon closing of the carriage cam contact C151, the output from this switch sets the trigger T2, Fig. 1c. Flipping of the trigger T2 drives its output line 212 positive, causing the related power tube PW2 to conduct, which in turn energizes the high speed clutch relay R213. Transfer of this relay closes contact R213a to energize or actuate the high speed clutch 98, Fig. 1a, over the conductor 214. The positive output from the trigger T2, Fig. 1c, is applied through the diode mix 161 to the detent trigger T3 to reset the same. This cuts off the power tube PW3 to release the detent and brake 102 and 103, respectively.

Under these conditions, the carriage immediately begins to accelerate to high speed, advancing the form 12 and control tape 108 in synchronism therewith. Since the line space diode switch 176, Fig. 1b, is held down by the related inverter 177 in the line 156 and the trigger T4 has been reset, the commutator and line space pulses are blocked at their respective diode switches 174 and 176.

With the form and control tape advancing at high speed, the control perforation 109 in the body channel 112, Fig. 6, will, within some time interval, pass out of the A zone and into the B zone, Fig. 1a. As this transition occurs, the output from A photocell 120 drops and the B zone cell 121 responds by raising the B line 191, Fig. 1c. Raising of the line 191 now causes an operation as previously described in that coincidence occurs at the diode B zone switch 187, Fig. 1b, which sets the trigger T4 to raise its output line 198 and at the same time the output from the switch 187 acts to provide a positive value at the speed transfer diode switch 215. This switch was previously conditioned by the positive output supplied over the output line 212 of the trigger T2. The output from the speed transfer diode switch 215 leads through the diode mix 158 and acts to set the low speed trigger T1, Fig. 1c.

Operation of the low speed trigger T1 raises its output line 159 to the power tube PW1 which in turn energizes the low speed relay R165 and connects the low speed clutch 97 to the carriage drive motor 92, Fig. 1a. This positive value on the line 159 also drives through a connecting diode mix 216, Fig. 1c, to reset the high speed trigger T2 which, of course, drops the related output line 212 leading to the power tube PW2 and de-energizes the high speed clutch 98 by droping out the high speed clutch relay R213. The same action opens the speed transfer diode switch 215, Fig. 1b.

The carriage now continues at the low speed rate, however, the low speed connection acts to decelerate the carriage to its low speed value. The timing and spacing is such to reduce the speed to its proper value by the time the control perforation 109 passes from the B zone, Fig. 1a, thereby generating a stop signal for the carriage through the detent diode switch 174, Fig. 1b, on the next arriving commutator pulse, as previously described for the low speed skip.

From the above it can be seen that if any control perforation in any of the selected channels is within the A or B zones when a selection is made, the carriage 13 will be selectively advanced at either low speed or high speed without interrupting the normal setup or printer operation.

For the purpose of this description, it will now be assumed several lines have been printed in the body portion of the form 12 in the described line space manner and that it is now desired to advance the form to print a total at the lower section thereof, Fig. 5. The total channel selector relay R217, Fig. 1b, operates to shift its related contacts in a manner identical to both the heading and body selection relays R185 and R207, respectively. The C pulse line 156 is raised by the transferred contact R217c in the usual manner and the total channel light is ignited by closing the contact R217b in the conductor 218. It will also be assumed that the control perforation 109 for the total channel 113, Fig. 6, happens to be somewhere to the right or out of range of the A zone and, of course, the B zone, Fig. 1a. While the total channel light 124 ignites, no perforation is available to permit this light to pass to either of the photoelectric cells 120 or 121. Thus the output from both tubes remains down and the related inverter 193, Fig. 1c, leading to the print suppression diode switch 188 remains positive. Since the B line 191 remains down, the high speed clutch trigger T2 is set from the switch 154, Fig. 1b, upon the application of the carriage start pulse over the line 152 in the exact manner as described for the high speed operation and the form is accelerated to high speed.

During this interval, the C pulse line 156 also conditions the print suppression diode switch 188, Fig. 1c, and as the constantly rotating subcycle shaft 87, carrying the subcycle cam 125 closes its cam contact C125, coincidence at the switch 188 directs an output to the print suppression power tube PW4 to cause the same to conduct and energize the print suppression relay R221. Transfer of this relay closes a contact R221a in a conductor 222 to energize the print head suppression magnet 19, Fig. 1a, to prevent actuation of the print heads 11 by latching the print head hammer mechanisms. At the same time, a related contact R221b, Fig. 1c, connected in series with the clutch run pulse cam contact C126 opens. This prevents the energization of the print clutch magnet 127, Fig. 1a, over the line 223 when the cam contact C126 closes, Fig. 1c.

De-energization of the print head magnet 127, Fig. 1a, at the normal clutch run pulse time indicates that the required form 12 movement will consume more time than the maximum allotted for the subcycle setup of the printer. Therefore, operation of the printer setup must be terminated until such time as the total line 118, Fig. 5, of the form reaches some predetermined position. While the print head, bail, setup and subcycle shafts 25, 80, 78 and 87, respectively, Fig. 1a, are continuously rotated, operation of the remaining controls is terminated as soon as the print clutch armature 128 engages the abutment 129 to stop rotation of the control shaft 89. That is, operation of the setup magnets 48, gas tubes 140 and storage gates 143 for feeding data to the buffer storage device 83, Fig. 1d, is held in abeyance.

Under the above conditions, the carriage is not affected and continues to advance the form 12 and control tape 108 at high speed. As the control perforation 109 in the total channel 113, Fig. 6, passes into the A zone, Fig. 1a, the related photocell 120 conducts over the line 200 to apply a positive output over the A line 209, Fig. 1c, through the diode mix 192 to the related inverter 193 to open the print suppression diode switch 188. This cuts off the power tube PW4 and permits the print suppression relay R221 to return to normal. While the total line 118 on the form still has 3½ inches to travel before it reaches its printing position, the printer can again begin initiating the first subcycle printing setup operation. With the print suppression relay R221 returned to normal, contact R211a opens to release the print heads and contact R211b closes so that as the clutch run cam 126 closes its contact C126, which is timed for the beginning of each subcycle of operation, the magnet 127, Fig. 1a, is energized to shift the armature 128 and permit re-engagement of the printer clutch 88. Re-engagement of the print clutch 88 initiates rotation of the control shaft 89 and all of the related control cams. The related cam contacts are closed in a preselected order to provide the proper readout and setup. While one or more timed subcycles were lost in this operation, re-engagement of the control clutch initiates a complete printing cycle. When the control perforation in the total channel 113 passes to the B zone, the carriage is decelerated and stopped just prior to the printing operation, as in the manner previously described.

From the above it can be seen that whenever a skip operation is called for requiring a period of time greater than normally allotted for form movement, only that portion of the following printing cycle is consumed which is required for form movement. This represents a considerable saving in time as indicated in the graphs shown in Figs. 13 and 14. In standard operation, with each eject or skip requiring more than the normal skipping distance, the output of the printer for the entire following printing cycle is lost, even though only a small portion of this cycle is consumed in form movement.

While the various conditions have been set forth and were applied to heading, body or total channels, it is to be understood that a short skip, long skip or printer suppress operation would be applicable to any of the channels.

The skip or eject channel 114, Fig. 6, under the control of the skip channel relay R224, Fig. 1b, may be included for conditions when the selector or printer desires to eject or advance forms or the like without printing. In this instance, the contact R224b energizes the related skip channel light 124, Fig. 1a, over the conductor 225.

From the above, it can be seen a skip operation removes the stop control of the carriage from the commutator 171, Fig. 1a, for a period during paper motion and transfers control to a selected tape channel. As the tape approaches the stopping point, control is restored to the commutator 171. Channel selection is accomplished by relay selection, which in turn energizes the appropriate channel illumination source. The selection circuit is arbitrarily arranged for higher order channels to take precedence if two or more channels are selected simultaneously.

The skip operations may be divided into three classifications and each is treated separately.

(1) *Short skip.*—Skip a distance of 1⅙ inches or less.

(2) *Long skip.*—Skip a distance of from 1⅓ to 3½ inches.

(3) *Long skip with lost printer subcycles.*—Skip a distance greater than 3½ inches.

*Machine latchup.*—If a skip cannot be completed in sixty-five milliseconds or less, the carriage controls must indicate this before skipping starts. If the displacement curve in Fig. 15 were continuous at the sixty-five millisecond point, then the only check that need be made would be whether the skip to be performed is less than a single maximum.

*Machine unlatching.*—If the machine is latched up for a skip requiring more than sixty-five milliseconds, then the carriage must provide an unlatching signal at machine clutch time when it determines that the paper will be stopped at the corresponding print time.

The discontinuity in the discplacement curve in Fig. 15 is at the point of transition between low and high speed skips. The time location of this discontinuity is determined by the maximum length skip made in low speed. This distance is in turn determined by the distance moved by the paper during slowdown and stop from high speed.

If a skip will require more than sixty-five milliseconds, this information must come from the printed form or the control tape in synchronism with the form. If all low speed skips can be completed within sixty-five milliseconds, then the machine latchup signal can come from a tape channel sensing device indicating whether the skip is larger or smaller than a fixed limit. This limit, of course, would be the maximum skip which could be completed in sixty-five milliseconds in high speed.

For optimum operation, the signal from the carriage which allows the printer to resume operation should also allow paper motion to continue until printing actually occurs.

The printer clutch 88, Fig. 1a, is actuated at a fixed point in each machine subcycle. In this embodiment, the carriage signal which gates the clutch actuating pulse appears approximately fifteen milliseconds before clutch time. In addition, there is a forty millisecond interval between clutch time and print time. Thus the tape sensing device should provide the gating signal considerably before the paper stop signal is available. After the tape hole passes the control sensing point, the paper will stop in five to ten milliseconds less than the normal skipping time, which is assumed to be sixty-five milliseconds.

*Résumé of controls*

(1) *Spacing.*—Single, double and triple spacing do not require tape control. However, the low speed clutch 97, Fig. 1a, must be energized to provide motion and must remain energized until a stop signal actuates the brake and detent 103 and 102, respectively. The counter and carriage commutator system 175, Fig. 1b, and 169, Fig. 1a, respectively, are utilized for single, double and triple spacing.

(2) *Overflow.*—The tape channel 115, Fig. 6, with a single sensing station 131, Fig. 1a, may be alloted for this function.

(3) *Channel selection.*—Channel selection may be provided electronically. However, where sufficient time is allowable, the use of the described relay switching may be permissible.

(4) *Speed control (skipping).*—When a tape channel is selected, the location of the control perforation 109 in that channel shall determine the carriage speed. If, before motion begins, the control perforation lies within the B zone, the carriage will start in low speed.

If the perforation does not lie within the B zone, the carriage will start in high speed but switch to low speed as the control perforation passes into the B zone.

(5) *Stop control (skipping).*—When the control perforation passes from the B zone, the brake and detent will be applied so that the form will stop with the following print line accurately located.

(6) *Lost subcycle control.*—If, before paper motion begins, the control perforation in the selected tape channel lies within the A zone, then the printer, and so forth, will continue to operate. However, if the control perforation lies outside the A and B zone, the printer shall be latched up.

The printer may be released or unlatched at the clutch time in any following subcycle after the control perforation has moved into the A zone.

The overflow channel associated with the control tape permits advancing of the form 12 under certain prescribed conditions. A means for providing an overflow to the body of a second or following form is diagrammatically shown. This includes the usual control perforation and brush contact 131, Fig. 1a, which is operative in the absence of a previous channel selection opening any of the "d" contacts in the overflow line 227, Fig. 1b, to cause conduction of a gas tube GT2. The plate to this gas tube is connected to the voltage supply by an overflow hold cam contact C228.

Conduction of the tube GT2 operates a relay R229 to close its contact R229a in a conductor 231 leading to the body channel selecting relay R207. However, energization of the relay R207 must be delayed for a later point in the cycle until an all cycles cam contact C232 closes. Closure of this contact transfers a relay R233 which is held through its contact R233a and the now closed hold cam contact C234. Closure of contact R233b provides a positive value over the conductor 231 to energize the body selector relay R207. This continues until the all cycles hold cam contact C234 opens and drops the relay R233. De-energization of the relay R229 occurs upon opening of the overflow plate hold cam cotact C228. The timing of the overflow control is such as to operate whenever the body 117 of a form is being filled and sufficient space is not available to permit complete listing of the data. Operation of the overflow control usually causes a skip to the first body line of the next form by energizing the line 231 leading to the body channel selector relay R207. Operation of this relay causes the carriage to automatically skip as previously described.

There is shown in Fig. 11 a timing chart for a six subbicycle printer wherein four subcycles are utilized for serial-parallel printing and two are allotted for the paper movement.

Fig. 3 discloses timing for a normal operation for forward and reverse readout of the print heads 11 including the timing of the control cam contact, print heads and setup bail operation based on a six subcycle printing operation with four subcycles allotted for printing. Fig. 4 discloses a similar timing chart wherein a two subcycle delay was required between printing cycles.

Fig. 12 is a graph showing the maximum high and low skip distance without a subcycle printer delay.

Figs. 13 and 14 are graphs showing the effective card rates versus skip distances with the subcycle delay feature.

From the above description, it can be seen that an improved high speed serial-parallel type printer has been provided that is capable of advancing forms to be printed a high speeds and that only that portion of a subsequent printing cycle is consumed during long skips which is necessary for paper movement.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A record feeding and printing device of the kind wherein printing is effected by recording in serial order a plurality of impressions side by side on a single line and having, in combination, means for line spacing said record after each set of a plurality of recording operations, means for long feeding said record after a set of a plurality of recording operations, means for selecting a long feeding operation, means responsive to a long feed selection to initiate operation of the long feeding means, and means under control of said long feed selecting means for delaying the resumption of recording by one or more serial recording portions of a cycle in accordance with the length of the feed selected.

2. Record feeding devices for cooperation with a printer wherein each printer head is impressed more than once on the same line of print to define a set, each impression of a set being a subcycle part of a complete printing cycle, a printer with a plurality of impression heads, means for line spacing and short feeding the record between sets of subcycles, the regular succession of two successive sets of subcycle impressions being undisturbed, means for long feeding the record, and control means operable with the record and controlling over the printer to prolong the interval between the corresponding sets of impressions of consecutive printing cycles by the time usually taken for one subcycle of printing, whereby printing is interrupted for less than a complete printing cycle for long feeding.

3. A record feeding and printing mechanism of the kind wherein printing is effected on a record in sets by recording in serial order a plurality of impressions side by side on a single line in a plurality of printing subcycles and having, in combination, means for spacing the record after each set of a plurality of recording operations, means for long feeding the record after a set of a plurality of recording operations, a control tape carrying controlling indicia, means for interrogating a predetermined location on said tape for a control indicium, means responsive to the location of the control indicium for selecting the long feeding operation by said long feeding means, and means under the control of said last-named means for delaying the recording of the next line by one or more serial recording portions of a printing cycle in accordance with the length of record feed required.

4. A record feeding and printing mechanism of the kind wherein printing is effected on a record by recording in serial order a plurality of impressions side by side on a single line in a plurality of printing subcycles and having, in combination, a record feeding device, means for line spacing the record after each set of a plurality of recording operations, means for long feeding the record after a set of a plurality of recording operations, means under control of the printing mechanism for initiating a record feed, a control tape carrying controlling indicia therein associated with said record feeding device, means for interrogating a predetermined area of said tape for the presence of a control indicium on said tape, means responsive to the position of the control indicium for selecting the long feeding operation by said long feeding means, means under control of said long feed selecting means for delaying the recording of the next line by one or more serial recording portions of a printing cycle, and means responsive to the appearance of the control indicium within the interrogated area during the long speed selection for initiating the printing operation.

5. A record feeding and printing mechanism of the kind wherein printing is effected on a record by recording in serial order a plurality of impressions side by side on a single line in a plurality of printing subcycles and having, in combination, a cyclically operated printer, a record feeding device, means for line spacing the record after each set of a plurality of recording operations, means for long feeding the record after a set of a plurality of recording operations, means under control of the printing mechanism for initiating a record feed, a multichannel control tape carrying control indicia within the channels, means for driving said tape and record in synchronism, means for selecting one of the control channels in said tape to provide a control indication for the type of feeding operation, stationary interrogation means having a portion disposed in proximity to said tape to interrogate a predetermined area thereof for the presence of the control indicium in the selected channel, said interrogation means being responsive in the absence of the control indicium in the selected channel to initiate a long feed operation, means under control of said long feeding selecting means for delaying the recording of the next line by one or more serial recording portions of a printing cycle, and means responsive to the appearance of the control indicium within the interrogated area during the long feed for initiating the printing operation prior to the record reaching the desired printing position.

6. A record feeding device for a record to be printed, a multiple head printer wherein each print head is impressed in a set more than once on the same line to be printed, each impression of a set being a subcycle part of a complete printing cycle, means for line spacing and short feeding the record between sets of subcycles, the regular succession of two successive sets of subcycle operations being undisturbed, means for long feeding the record, means for initiating the feeding of a record, and control means associated with said record feeding device and operative for controlling the printer to prolong the interval between the corresponding sets of impressions by one or more subcycles, whereby printing is interrupted for less than a complete printing cycle for a long feed.

7. In combination, a printer having a plurality of spaced printing heads for impressing data on a record more than once on the same line in a set of successive impressions, each impression of a set being a subcycle part of a complete printing cycle; a record feeding device including means for line spacing and short feeding the record between sets of subcycles, the regular succession of two successive sets of subcycle operations being undisturbed, and means for long feeding the record; means under the control of the printer for initiating the feeding of a record; a control tape associated with said record feeding device and operative in synchronism with said record, said tape having at least one control indicium therein; means for interrogating a fixed area of said control tape for the presence of the control indicium, said interrogation means being responsive in the absence of the control indicium in the interrogated area for initiating a long feed operation for the record; control means associated with said interrogation means operative in response to the long feed indication for interrupting the printer operation to prolong the normal interval between successive printing cycles by one or more timed subcycles, whereby printing is interrupted by less than a complete printing cycle for a long feed; and means operative upon the appearance of the control indicium in the interrogated area for stopping the long feed operation and initiating the printer operation at the next normal timed subcycle.

8. In combination, a printer having a plurality of spaced printing heads for impressing data on a record more than once on the same line in a set of successive impressions, each impression of a set being a subcycle part of a complete printing cycle; a multispeed record feeding device including means for line spacing and short feeding the record at a low speed between sets of printing subcycles, the regular time succession of two successive sets of subcycles being undisturbed and for long feeding the record at a high speed; means under control of the printer for initiating the feeding of a record; a multichanneled control tape associated with said record feeding device operative in synchronism with the record, said tape having at least one channel with a control indicium therein; means for interrogating an area of said control tape for the presence of the control indicium; means for selecting the channel for interrogation, said interrogation means being responsive in the absence of the control indicium for initiating a long feed operation; control means associated with said interrogation means operative in response to the long feed indication for interrupting printer operation to prolong the normal interval between successive printing cycles by one or more timed subcycles, whereby printing is interrupted for less than a complete printing cycle for a long feed; and means operative upon the appearance of the control indicium at the interrogated area for stopping the long feed operation and initiating the printer operation at the next normal timed subcycle.

9. In a cyclically operable printer of the type described in which a line is printed on a record form during each machine cycle by making a plurality of impressions during successive printing subcycles, with lateral relative shifting of print impression means and record form at each printing subcycle; print impression means, a carriage to support a record form for the impression means, printer driving means, means actuated by said printer driving means for operating said print impression means in each of a plurality of printing subcycles during each machine cycle, means actuated by said printer driving means for causing a lateral relative shift of said print impression means and the record form each printing subcycle, means for operating said carriage to feed the record form variable distances in line spacing direction, means to determine the length of feed to be executed by the carriage, means operable in response to determination of a carriage feed greater than a predetermined length for stopping the printer operation, and means operable at subcycle time increments, dependent upon the progress of the carriage feed, to restart the printer operation at any one of a plurality of printing subcycle times.

10. In a cyclically operable printer of the type described in which a line is printed on a record during each machine cycle by making a plurality of impressions during successive printing subcycles, with lateral relative shifting of print impression means and record at each printing subcycle; print impression means, a carriage to support a record for the impression means, printer driving means, means actuated by said printer driving means for operating said print impression means in each of a plurality of printing subcycles during each machine cycle, means actuated by said printer driving means for causing a lateral relative shift of said print impression means and the record each printing subcycle, means for operating said carriage at a low speed or a high speed to feed the record form variable distances in line spacing direction, a multichannel control tape operative in synchronism with the record form, said tape having a control indicium in at least one of the channels, stationary interrogation means associated with said tape for detecting the control indicium in certain of the channels when within a predescribed area, means for selecting one of the channels for interrogation, means under control of said printer for initiating carriage movement, means operative in response to the output from said interrogation means when the control indicium is out of the predescribed area for advancing the record at high speed, control means associated with said interrogation means and operative under the same conditions for interrupting printer operation to prolong the normal interval between successive printing cycles by one or more timed subcycles, whereby printing is interrupted for less than a complete printing cycle for a long feed, and means operative upon the appearance of the control indicium within the predecribed area to restart the printer operation at any one of a plurality of the later following timed subcycles.

11. In a cyclically operable printer for printing a line of data on a record form having a plurality of impression receiving positions in a plurality of subcycles of operation, the combination of a printing device, means for relatively moving said printing device and the record to impress a character on the latter during a subcycle of printer operation, means for relatively laterally shifting the record and said printing device to align a second impression receiving position, said printing device being operative during each subcycle to impress a character on the record at a different position, the number of printing subcycles being sufficient to provide the desired line of data, a record feeding device, control means responsive after the last printing subcycle of a print cycle for advancing the record, anticipating means associated with said control means for anticipating required record movement greater than normal, means responsive to operation of said anticipating means for interrupting the beginning of the next printing cycle, and means for initiating the printer operation when the record approaches the desired position for printing, the first subcycle printing operation of the delayed printing cycle occurring at some time interval less than a normal cycle of operation.

12. In a cyclically operable printer for printing a line of data on a record having a plurality of impression receiving positions in a predetermined number of subcycles of operation, the combination of a printing device, means for driving said printing device to impress a character on the record during a subcycle of printer operation, means for relatively laterally shifting the record and said printing device to align a second impression receiving position, said printing device being operative during each subcycle to impress a character on the record at a different position, the number of printing subcycles being sufficient to provide the desired line of data, a record feeding device, control means responsive after the last printing subcycle of a printing cycle for advancing the record, means operated by said printer to initiate record movement, means for anticipating required record movement greater than normal, means responsive to the operation of said anticipating means for interrupting the beginning of the next printing cycle for one or more timed subcycle intervals, and means for initiating the printer operation when the record approaches the desired position for printing, the first subcycle printing operation of the delayed printing cycle occurring at same time interval less than a normal cycle of operation.

13. In a cyclically operable printer for printing a line of data on a record having a plurality of character impression receiving positions in a predetermined number of timed subcycles of operation, the combination of a plurality of printing devices spaced at least two character positions apart to provide a serial-parallel printing operation, means for preselecting and setting up the characters in the printing devices during a subcycle of operation, means for impressing the selected characters on the record during the subcycle printing operation, said character selection and impressing operation occurring for each printing subcycle to complete a line of data in a serial-parallel manner, a record feeding device for controlling movement of the record to be printed at the completion of each complete printing cycle, control means associated with said record feeding device and responsive to desired record movement for interrupting the next printing cycle for one or more timed subcycles, and means dependent upon the record reaching some predetermined position for initiating the first subcycle printing operation of the next printing cycle at the beginning of the next timed subcycle, said printer being thereafter operated at the predetermined subcycle rate.

14. In a cyclically operable printer for printing a line of data on a record having a plurality of impression receiving positions in a predetermined number of timed subcycles, the combination of a serially operated printing device, means for preselecting the character to be impressed by said printing device during a subcycle of printer operation, means for impressing the selected character on the record, means for relatively laterally shifting the record and said printing device to align a second impression receiving position with the printing device, said character selecting means and printing impression means being operative during each printing subcycle to impress the desired characters, the number of printing subcycles being sufficient to provide the desired line of data, a record feeding device for controlling movement of the record, means under the control of the printer for advancing the record after the last printing subcycle, record movement instruction means associated with said record feeding device, means for anticipating a paper movement instruction greater than normal, means responsive to the operation of the anticipating means for interrupting the beginning of the next cycle of printer operation for one or more timed printing subcycles, and means for initiating printer operation after the desired line on the record approaches the proper printing position, the first subcycle of the delayed printing cycle occurring at a time interval less than a complete printing cycle.

15. In a cyclically operable printer for printing a line of data on a record having a plurality of impression receiving positions in a predetermined number of timed subcycles of operation, the combination of a plurality of printing devices spaced more than one impression receiving position apart to provide for serial-parallel printing, means for preselecting the characters to be impressed by each printing device during a subcycle printing operation, means for simultaneously impressing the selected characters at each printing device on said record during the printing subcycle, means for relatively laterally shifting the record and said printing devices to align the second impression receiving position for printing, said character selecting means and print impression means being operative during each printing subcycle to impress the desired characters on the record, a record feeding carriage for controlling movement of the record to be printed at the completion of each complete printing cycle, means operated by said printer to initiate carriage and record movement, selecting means for determining the required record movement, control means associated with said carriage and responsive to required record movement beyond a predetermined length for interrupting the next printing cycle for one or more timed subcycles, and means dependent upon the record reaching some predetermined position for initiating the first subcycle printing operation at some timed interval beyond the normal beginning of the next printing cycle, said printing devices thereafter being operated at the regular subcycle rate to print the line of data.

16. In a cyclically operable printer for printing a line of data on a record from having a plurality of character receiving positions in one cycle of operation, the combination of a multispeed carriage for controlling movement of the record to be printed at the completion of each complete printing cycle, carriage control means to cause operation of said carriage at a line space and low speed skip or at a high speed skip, a plurality of printing devices spaced at least two character receiving positions apart, means for supplying a line of data to the printer, means for selecting the characters in the data to be printed for each printing device, means for operating said printing devices to impress the selected data at their respective character receiving positions within a subcycle portion of the cycle of operation, means for shifting the printing devices to a second character receiving position after the first subcycle printing operation while said data selecting means is operative to select a second group of characters to be printed upon the next subcycle of printer operation, means operative by said printer at the end of a printing cycle to initiate carriage movement, line selecting means operating through said carriage control means to advance said carriage and record at a low or a high speed, means operative with said carriage control means during a high speed skip operation for interrupting printer operation for a time interval of one or more subsequent timed subcycles when the selected line on the record will fail to be in position to receive the data supplied during the next normal printing cycle, said last-named means being operative as the selected line reaches a predetermined position for reconnecting the printer to initiate the operation of the first subcycle of the next printing cycle at the beginning of the next timed interval subcycle, said printer being thereafter cyclically operated from the beginning of the first actual printing subcycle.

17. In a cyclically operable printer for printing a line of data on a record having a plurality of impression receiving positions in a predetermined number of subcycles of operation, the combination of a plurality of printing devices spaced more than one impression receiving position apart to provide for a serial-parallel printing operation at a printing station, means for preselecting the order of the characters to be printed during printing subcycles, means for operating said printing devices to simultaneously impress the selected character at the timed subcycle rate, means for laterally shifting said printing devices to align the same with subsequent printing positions, said character selecting means and printing devices being operative during each printing subcycle to impress the desired data on the record, a multispeed record feeding carriage for controlling movement of the record past the printing station, means for advancing the record at line space speed at the completion of each printing cycle, a multichannel control tape having control indicia therein operated by said carriage, means for selecting the controlling channel, means for detecting the control indicium in the selected channel, means responsive to the location of the selected control indicium within a first area for operating said carriage at a low speed skip without interfering with printer operation, means responsive when the control indicium is in a second area for operating said carriage at a high speed skip without interferring with printer operation, means responsive when the control indicium is at some location other than the first and second areas to operate the carriage at high speed and to suppress the next printing cycle, said last-named means being operative after the control indicium enters the second area for reconnecting the printer at the next timed interval subcycle to initiate the first printing subcycle of the next printing cycle, said printing cycle being thereafter timed from the first printing subcycle.

18. In a cyclically operable printer for printing a line of data on a record having a plurality of impression receiving positions in a predetermined number of subcycles of operation, the combination of a plurality of printing devices spaced more than one impression receiving position apart to provide for a serial-parallel printing operation at a printing station, means for preselecting the order of the characters to be printed during timed printing subcycles, means for operating said printing devices to simultaneously impress the selected characters at the subcycle rate, means for laterally shifting said printing devices to align the same with subsequent printing positions, said character selecting means and printing devices being operative during each printing subcycle to impress the desired data on the record, drive means for said printing devices, clutch means between said drive means and said printer to interrupt operation of the latter, a multispeed carriage for feeding continuous forms to and from the printing station for line printing, drive means for said carriage, a clutch connecting said carriage drive means to said carriage to advance the forms at a low speed, means for line spacing the forms under low speed conditions, means connecting said carriage drive means and carriage to advance the forms at a high speed, a multichannel control tape having control perforations therein corresponding to the starting lines on the form for selectively controlling the operation of said carriage, means for selecting the controlling channel in said tape at the end of a printing cycle, low speed sensing means encompassing a first area and responsive to the location of the control perforation in the selected channel appearing therein for operating said clutch to advance the forms to a predetermined print receiving line at low speed without interfering normal printing operation, a high speed skip sensing means encompassing a second area and responsive to the control perforation appearing therein for operating the carriage at high speed to advance the form to the predetermined print receiving line without interrupting normal printer operation, means responsive when the control perforation is at some location other than the first and second areas to advance the form at high speed and interrupt the next printing cycle, said last-named means being operative after the selected control perforation enters the high speed sensing second area for reconnecting the printer at the next timed interval subcycle to initiate the first printing subcycle of the next printing cycle, said printing cycle being thereafter timed from the first actual printing subcycle, means for decelerating the high speed operation of said carriage by reconnecting the same to said low speed clutch, and means for stopping said carriage prior to the first subcycle printing operation.

References Cited in the file of this patent

UNITED STATES PATENTS

| | | |
|---|---|---|
| 2,531,885 | Mills | Nov. 28, 1950 |
| 2,654,580 | Pentecost | Aug. 14, 1951 |
| 2,684,746 | Bakelaar | July 27, 1954 |
| 2,747,717 | Cunningham | May 29, 1956 |